(12) United States Patent
Altshuler et al.

(10) Patent No.: US 10,398,957 B2
(45) Date of Patent: Sep. 3, 2019

(54) PITCHING SIMULATOR SYSTEMS AND METHODS

(71) Applicant: InMotion Systems, LLC, Westborough, MA (US)

(72) Inventors: Yury Altshuler, Needham, MA (US); Michael Anthony Donfrancesco, Westborough, MA (US); Thomas George Stepsis, Watertown, MA (US)

(73) Assignee: InMotion Systems, LLC, Westborough, MA (US)

( * ) Notice: Subject to any disclaimer, the term of this patent is extended or adjusted under 35 U.S.C. 154(b) by 0 days.

(21) Appl. No.: 15/439,477

(22) Filed: Feb. 22, 2017

(65) Prior Publication Data

US 2017/0157484 A1 Jun. 8, 2017

Related U.S. Application Data

(63) Continuation-in-part of application No. 13/739,769, filed on Jan. 11, 2013, now Pat. No. 9,597,570.
(Continued)

(51) Int. Cl.
*A63B 69/00* (2006.01)
*A63B 24/00* (2006.01)
*A63B 71/06* (2006.01)
*G06K 9/00* (2006.01)
*G09B 19/00* (2006.01)

(52) U.S. Cl.
CPC ...... *A63B 69/0002* (2013.01); *A63B 24/0021* (2013.01); *A63B 71/0619* (2013.01); *G06K 9/00342* (2013.01); *G09B 19/0038* (2013.01); *A63B 2024/0031* (2013.01); *A63B 2024/0034* (2013.01); *A63B 2024/0056* (2013.01); *A63B 2024/0096* (2013.01); *A63B 2069/0006* (2013.01); *A63B 2069/0008* (2013.01); *A63B 2071/065* (2013.01); *A63B 2071/0638* (2013.01); *A63B 2208/0204* (2013.01); *A63B 2220/05* (2013.01); *A63B 2220/13* (2013.01); *A63B 2220/30* (2013.01)

(58) Field of Classification Search
None
See application file for complete search history.

(56) References Cited

U.S. PATENT DOCUMENTS 5,443,260 A 8/1995 Stewart et al.
5,846,139 A 12/1998 Bair et al.
(Continued)

*Primary Examiner* — Damon J Pierce
(74) *Attorney, Agent, or Firm* — Nutter McClennen & Fish LLP

(57) ABSTRACT

Pitching simulator systems and methods are provided that are used to predict real-life outcomes for a real-life pitch. Predicted real-lift outcomes can be outcomes such as a hit (e.g., groundout, double, home run, etc.), strikeout, etc., and can be made in real-time. More specifically, the systems and methods can identify pitch metrics corresponding to the real-life pitch, cross-reference data in the form of system performance metrics that can related to data about batters, fielders, and/or an environment, and then calculate a virtual pitched ball outcome based on a combination of the pitch metrics and the system performance metrics. Computer programs capable of being used in such systems and methods, as well as other systems and methods, are also provided.

27 Claims, 8 Drawing Sheets

Related U.S. Application Data

(60) Provisional application No. 61/586,421, filed on Jan. 13, 2012.

(56) References Cited

U.S. PATENT DOCUMENTS

| | | |
|---|---|---|
| 5,882,269 A | 3/1999 | Lewis |
| 7,335,116 B2 | 2/2008 | Petrov |
| 7,544,137 B2 | 6/2009 | Richardson |
| 2002/0176000 A1 | 11/2002 | Katayama |
| 2005/0113158 A1 | 5/2005 | Sterchi et al. |
| 2007/0265043 A1 | 11/2007 | Wang et al. |
| 2009/0029754 A1* | 1/2009 | Slocum .............. A63B 24/0087 463/5 |
| 2010/0255939 A1 | 10/2010 | York |
| 2010/0298958 A1 | 11/2010 | Connelly |
| 2012/0115556 A1 | 5/2012 | Sogabe et al. |
| 2012/0194736 A1* | 8/2012 | Dasher .............. H04N 21/4402 348/500 |
| 2013/0218308 A1 | 8/2013 | Altshuler et al. |

* cited by examiner

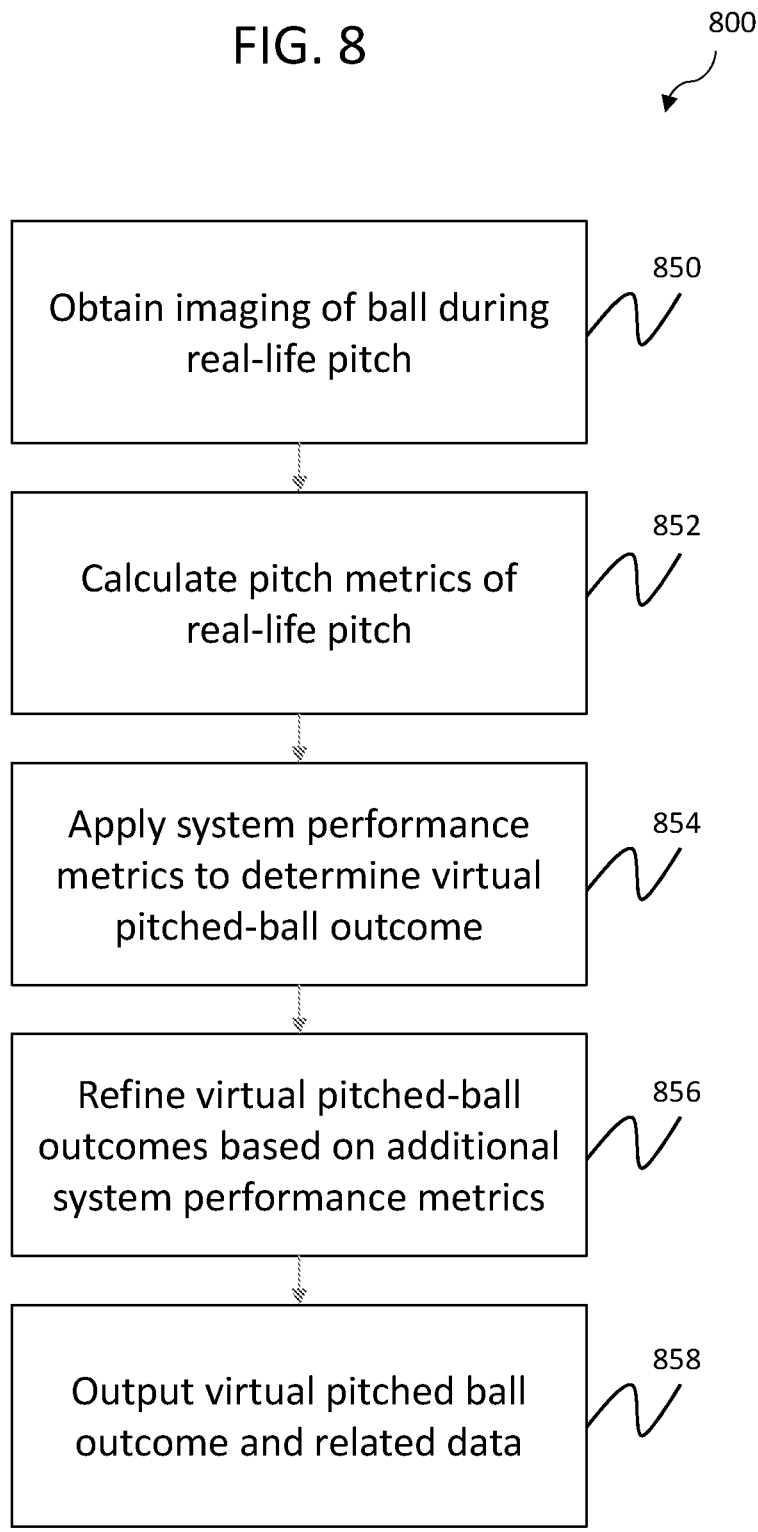

PITCHING SIMULATOR SYSTEMS AND METHODS

RELATED APPLICATIONS

This patent application is a continuation-in-part of and claims priority to U.S. patent application Ser. No. 13/739,769, filed on Jan. 11, 2013, entitled "Batting Simulator System," and claims the benefit of U.S. Provisional Application No. 61/586,421, filed on Jan. 13, 2012, entitled "Batting Simulator System," the contents and teachings of which are hereby incorporated by reference in their entireties.

BACKGROUND

Baseball is a game that relies heavily on statistics. For example, the possibility of a player making the Hall of Fame can depend upon mere percentage points when looking at the player's career batting average. Additionally, statistics are used to assess a player's skill and are reviewed in great detail when determining if the player is able to reach higher levels of expertise. A player's ability to improve his performance and the associated statistics over the course of a season or career will greatly enhance the probability of his success at a variety of levels.

Over the past few decades, there has been a transformation in the way children and young adults practice and play baseball. Rather than gathering around the local sandlot, a number of ball players, for both baseball and softball, now receive professional instruction from experienced coaches at local indoor baseball facilities. With respect to hitting, conventional indoor baseball facilities offer year round clinics utilizing batting cages and pitching machines to improve the players' swing mechanics, bat speed, and ability to hit the ball on the sweet spot of the bat. As a result, the indoor baseball facilities can help to improve the players' batting average.

SUMMARY

In conventional baseball facilities, players take batting practice in batting cages that are 70 feet long by 12 feet wide and often hit balls into screens that are placed in relatively close proximity to the player. While coaches often manually chart the number of hard hit balls during the batting session, the coaches do not have a mechanism available to quantitatively measure the end result of the batted ball. For example, based upon the dynamics of the hit ball, the coach cannot quantitatively measure whether the hit results in a line drive double in the gap or fly ball to the left fielder. Knowledge of the metrics behind the batted ball can assist the coach in assessing the progress of a hitter and can increase the player's interest in the game and batting confidence.

Electronic batting simulators that measure the motion of a batted ball have been previously developed, but have failed to reach general commercial availability because of relatively high costs and impractical hardware configurations. For example, conventional batting simulators include a series of optical sensors that detect the passage of a batted ball through a plurality of relatively large detection planes and a computerized device electrically coupled to the optical sensors configured to calculate the projected trajectory and velocity of the batted ball. The computerized device of the conventional batting simulator can generate graphics of a baseball game played in response to the batted ball and can display the projected flight of the batted ball relative to the baseball game graphics. However, the proposed conventional batting simulators, similar to manual charting methods, lack a mechanism available to quantitatively measure the end result of the batted ball (e.g., whether a line drive was a double in the gap or fly ball to the left fielder) which can be used in assessing the progress of a hitter.

By contrast to conventional batting systems, embodiments of the present innovation relate to a batting simulator system. In one arrangement, in response to a user hitting a pitched ball, the batting simulator system is configured to measure the exit velocity and trajectory of the batted ball and, in combination with a system performance metric, provide the outcome or result of the ball hit (e.g., ground out, double, home run, etc.) in real-time. For example, the system performance metric can relate to a performance metric of a virtual fielder, such as the fielder's reaction time, running speed, and arm or throwing strength, a performance metric of the hitter, such as the hitter's running speed, and/or an environmental factor associated with a virtual playing field, such as wind direction, humidity level, and temperature. The player's individual performance metrics can be based on the player's age and/or gender, for example, and can be used in factoring the likely outcome of a hit. The system can also incorporate actual real-world performance metrics for a hitter based upon data entered into the system by the hitter or the coach.

As the batting simulator system collects exit ball velocity, ball trajectory, and outcome data, the system is configured to provide data such as batting average, exit ball velocity, and distance of batted ball in real-time via an output device such as a monitor. Additionally, the batting simulator system can display a virtual stadium as well as the trajectory and outcome of the batted ball within the virtual stadium. Furthermore, in one arrangement, the batting simulator system can store the results in a database and later compile and output these results to the user to allow the user or a coach to identify hitting tendencies over the course of one hitting session or over an entire season. The coach or hitter can utilize this data to optimize the hitter's swing mechanics with the goal of improving performance.

In one arrangement, the computerized device is configured as a gaming module. For example, with the outcome data of the batted ball being collected by the computerized device in real-time, the computerized device can be utilized by players and/or teams to compete against a computerized defense. In one arrangement, the defense can use algorithms based on artificial intelligence gathered from generally accepted baseball strategies and tactics to determine the correct defensive play for any given circumstance. For example, the computerized device can determine if the defense should execute a double play with base runners on first and second rather than prevent the base runner on second base to advance to third.

In one arrangement, in a batting simulator system having a set of cameras and a computerized device disposed in electrical communication with the set of cameras, embodiments of the innovation relate to a method for detecting a result of the ball hit. The method includes receiving, by the computerized device, a set of measurements of a ball associated with a ball hit, detecting, by the computerized device, a trajectory and exit ball velocity of the ball based upon the set of measurements, combining, by the computerized device, the detected trajectory and exit ball velocity with a system performance metric to generate a virtual ball hit outcome, and outputting, by the computerized device, the virtual ball hit outcome on an output device.

Systems and methods are also provided for pitching simulation. In one exemplary pitching simulator system, the system includes a detector device and a computerized device communicatively coupled to the detector device. The detector device is operable to image a real-life pitch of a ball. The computerized device is operable to perform a number of functions, including: retrieve one or more system performance metrics relating to at least a virtual batter, identify one or more pitch metrics corresponding to the real-life pitch, calculate a virtual pitched ball outcome based on a combination of the one or more pitch metrics and the one or more system performance metrics, and output the virtual pitched ball outcome, which is a predicted real-life outcome for the ball of the real-life pitch is output, via an output device. The one or more system performance metrics are retrieved prior to the real-life pitch of the ball, and the one or more pitch metrics can include, for example, one or more of location, speed, spin of the ball, movement of the ball (e.g., break or fade and/or rising or falling), etc., during the real-life pitch.

In some embodiments, the real-life pitch can include a sequence measured from at least a first instance to at least a second instance. The first instance can be, for example, a time when the ball is released by a pitcher, and the second instance can be, for example, a time when the ball crosses a plate at a furthermost point from the pitcher. Alternatively, the first instance can be, for example, a time when a pitcher initiates a wind-up motion for the real-life pitch, and the second instance can be, for example, a time when the ball crosses a plate at a furthermost point from the pitcher.

Further expounding on the operable nature of the computerized device to calculate a virtual pitched ball outcome, the computer device can be operable to identify matching pitches from one or more databases, determine one or more candidate outcomes based on the matching pitches, calculate odds for each of the candidate outcomes, select one of the candidate outcomes based on the respective odds, and assign the value of the selected one of the candidate outcomes to the virtual pitched ball outcome. Matching pitches can include stored entries of real-life pitches, and each of the entries can include, for example, for each of the respective matching pitches, one or more of: (1) pitch metrics, (2) pitch outcome, (3) hitter data, (4) fielder data, and (5) environmental factors. The one or more databases can include one or more databases of real-life offensive and defensive data tracked from a baseball league (e.g., Major League Baseball, Division I college softball, Little League, etc.). In some embodiments, the computerized device can be configured to operate by referencing a database of information to determine an outcome of the real-life pitch, based, for example, on one or more data points contained in the database related to how a similar real-life pitch was hit in the past (e.g., exit velocity of the hit ball, launch angle of the hit ball, distance and/or location of the hit ball, etc.), such as those associated with the HitTrax databases, owned by InMotion Systems, LLC of Northborough, Mass.

The system performance metrics of a virtual batter can include metrics of a virtual batter related to an ability of the virtual batter to hit the real-life pitch based on the one or more pitch metrics corresponding to the real-life pitch. The one or more system performance metrics can, for example, relate to one or more virtual fielders and environmental factors, with the system performance metrics of the one or more virtual fielders including metrics related to an ability of a fielder to field the ball and/or throw the fielded ball, and the system performance metrics of environmental factors including attributes associated with a virtual playing field and/or virtual playing conditions. In some embodiments, the one or more system performance metrics can be calculated for the virtual batter, the one or more virtual fielders, the virtual playing field, and the virtual playing conditions based on real-life metrics of a real-life batter, a real-life fielder, a real-life playing field, and real-life playing conditions, respectively. The system performance metrics of the virtual batter can include system performance metrics of the virtual batter as a virtual base runner.

The detector device can be configured to capture images of the ball during the real-life pitch at a frames per second rate exceeding a determined threshold. In some embodiments, the detector device can include one or more cameras. The function of the computerized device that allows the computerized device to be operable to identify one or more pitch metrics corresponding to the real-life pitch can include the computerized device being operable to identify the one or more pitch metrics based on images of the real-life pitch taken by the detector device and/or calculate attributes of the ball at one or more instances during the real-life pitch.

In one exemplary embodiment of a method for determining outcomes from pitched balls, the method includes imaging a real-life pitch of a ball, retrieving one or more system performance metrics, identifying one or more pitch metrics that correspond to the real-life pitch, calculating a virtual pitched ball outcome based on a combination of the identified one or more pitch metrics and the one or more retrieved system performance metrics, and outputting the virtual pitched ball outcome, the outcome being a predicted real-life outcome for the ball of the real-life pitch. The one or more system performance metrics relate to at least a virtual batter and are retrieved prior to the real-life pitch of the ball. The one or more pitch metrics include one or more of location, speed, spin of the ball, movement of the ball (e.g., break or fade and/or rising or falling), etc. during the real-life pitch.

In some embodiments, the real-life pitch can include a sequence measured from at least a first instance to at least a second instance. The first instance can be, for example, a time when the ball is released by a pitcher, and the second instance can be, for example, a time when the ball crosses a plate at a furthermost point from the pitcher. Alternatively, the first instance can be, for example, a time when a pitcher initiates a wind-up motion for the real-life pitch, and the second instance can be, for example, a time when the ball crosses a plate at a furthermost point from the pitcher.

The step of calculating the virtual pitched ball outcome can include steps such as identifying matching pitches from one or more databases, determining one or more candidate outcomes based on the matching pitches, calculating odds for each of the candidate outcomes, selecting one of the candidate outcomes based on the respective odds, and assigning the value of the selected one of the candidate outcomes to the virtual pitched ball outcome. Matching pitches can include stored entries of real-life pitches, and each of the entries can include, for example, for each of the respective matching pitches, one or more of: (1) pitch metrics, (2) pitch outcome, (3) hitter data, (4) fielder data, and (5) environmental factors. The one or more databases can include one or more databases of real-life offensive and defensive data tracked from a baseball league (e.g., Major League Baseball, Division I college softball, Little League, etc.).

The system performance metrics of a virtual batter can include metrics of a virtual batter related to an ability of the virtual batter to hit the real-life pitch based on the one or more pitch metrics corresponding to the real-life pitch. The one or more system performance metrics can, for example, relate to one or more virtual fielders and environmental factors, with the system performance metrics of the one or more virtual fielders including metrics related to an ability of a fielder to field the ball and/or throw the fielded ball, and the system performance metrics of environmental factors including attributes associated with a virtual playing field and/or virtual playing conditions. In some embodiments, the one or more system performance metrics can be calculated for the virtual batter, the one or more virtual fielders, the virtual playing field, and the virtual playing conditions based on real-life metrics of a real-life batter, a real-life fielder, a real-life playing field, and real-life playing conditions, respectively. The system performance metrics of the virtual batter can include system performance metrics of the virtual batter as a virtual base runner.

Imaging a real-life pitch of a ball can include capturing images of the ball during the real-life pitch at a frames per second rate that exceeds a determined threshold. In some embodiments, one or more cameras can be used to image the real-life pitch. The step of identifying one or more pitch metrics corresponding to the real-life pitch can include identifying one or more pitch metrics based on the imaging of the real-life pitch. Alternatively, or additionally, the step of identifying one or more pitch metrics corresponding to the real-life pitch can include calculating attributes of the ball at one or more instances during the real-life pitch.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

FIG. 8 is a flowchart of a procedure performed by the computerized device of FIG. 1, according to one arrangement.

DETAILED DESCRIPTION

Figure 1:
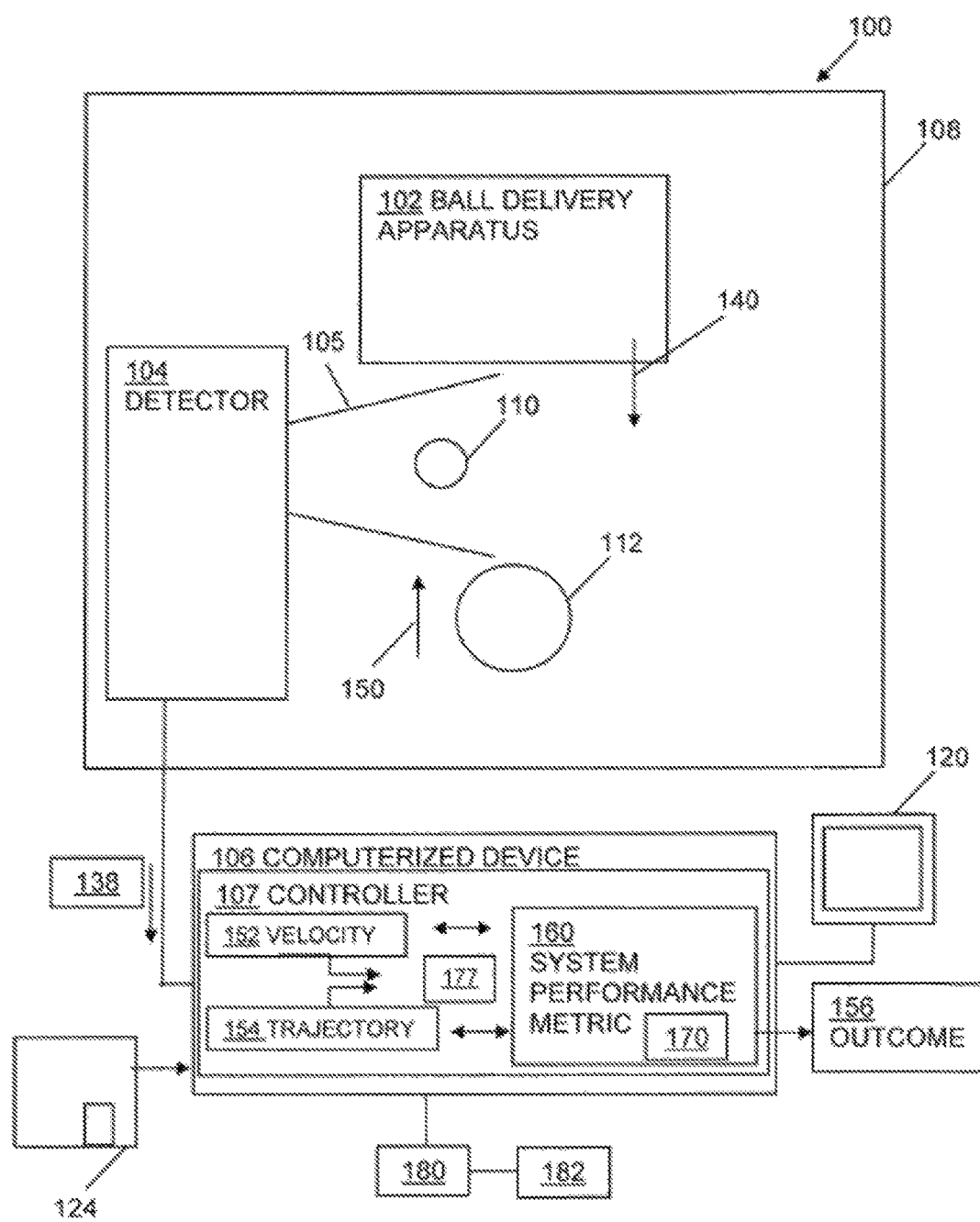
FIG. 1 illustrates an overhead view of a schematic representation of a batting simulator system, according to one embodiment.

In response to a user hitting a pitched ball, the batting simulator system is configured to measure the exit velocity and trajectory of the batted ball and, in combination with a system performance metric, provide the outcome or result of the ball hit (e.g., ground out, double, home run, etc.) in real-time. For example, the system performance metric can relate to a performance metric of a virtual fielder, such as the fielder's reaction time, running speed, and arm or throwing strength, a performance metric of the hitter, such as the hitter's running speed based upon the user's age, and/or an environmental factor associated with a virtual playing field, such as wind direction, humidity level, and temperature. As the batting simulator system collects exit ball velocity, ball trajectory, and outcome data, the batting simulator system is configured to provide data such as batting average, slugging percentage, and exit velocity of the ball in real-time via an output device such as a monitor. Additionally, the batting simulator system can display a virtual stadium and as well as the trajectory of the batted ball and outcome of the ball hit in the stadium. Furthermore, in one arrangement, the batting simulator system can store and later output these results to the user to allow the user or a coach to identify hitting tendencies and optimize swing mechanics over the course of one hitting session or over an entire season.

A pitching simulator system is also provided. In response to a user pitching a ball, the simulator system is configured to measure metrics of a pitched ball (e.g., speed, location, movement, spin, movement (e.g., break or fade and/or rise or fall)), etc., and, in combination with one or more system performance metrics, provide a virtual pitched ball outcome. A virtual pitched ball outcome is a predicted real-world outcome or result of the real-life pitched ball, such as a hit, out, foul ball, strike, or ball. The virtual pitched ball outcome can be more specific as well, including but not limited to identifying the type and location of a hit (e.g., single to shortstop, double to left field, home run to center field, etc.), the type and location of an out (e.g., ground out third-to-first, line out to second, fly out right field, etc.), the type and location of a foul ball (e.g., pop-up to the catcher but dropped, caught by the catcher for a third strike, fly ball to the left fielder and caught, fly ball to the left field but out of reach), and the type of strike (e.g., swing-and-miss in the strike zone, swing-and-miss out of the strike zone, looking).

The system performance metrics are stored in one or more databases corresponding to or in communication with the pitching simulator system. The system performance metrics can relate to performance metrics of virtual batters, virtual fielders, and environmental factors. System performance metrics of virtual batters include any data available related to how a specific batter performs hitting generally and/or in response to the measured pitched ball metrics, where a specific batter may be, for example, a specific individual known person or a generalized individual based on one or more demographics (e.g., age, gender, ability, game type like baseball vs. softball, or more specifically thirteen year old boy, male professional baseball third baseman, male professional baseball player, male single-A baseball left fielder, single-A baseball player, female Division III softball shortstop, male Division III baseball player). A virtual batter's performance running after a ball is hit can also be accounted for, based, for example, on data related to the batter's speed, propensity to take an extra base, etc. System performance metrics of virtual fielders include any data available related to how a specific fielder performs fielding generally and/or in response to predicted locations of where a ball ends up after the pitch and batter information is taken into account (i.e., a calculated virtual pitched ball outcome based on the batter system performance metrics), where a specific fielder may be, for example, a specific individual known person or a generalized individual based on one or more demographics (non-limiting examples provided above). Environmental factors include many factors described through the present disclosure, including but not limited to factors associated with a virtual playing field, such as wind direction, humidity level, and temperature, as well as known elements of a field, such as its playing field dimensions, topography, turf type, particular obstacles, etc. Notably, the types of data listed throughout the present disclosure is only a small sample size of the available data that can be used for purposes of determining system performance metrics, and such listing is by no means limiting to the types of data that can be used, whether that data is now known or is determined at some point in the future. Exemplary compilations of data that can be used as system performance metrics include a database of actual pitches in an Major League Baseball game (or any other league for that matter) or from the results within the HitTrax databases, owned by InMotion Systems, LLC of Northborough, Mass., using measured hit and defensive performance metrics stored in the databases. For example, databases like the HitTrax databases can include information about how a similar real-life pitch was hit in the past that can be relied upon to make a determination of the result of the real-life pitch. This information can include data such as an exit velocity of a hit ball, a launch angle of a hit ball, a distance and/or location of the hit ball, among other data related to a hit ball.

As the simulator system collects and processes the pitched ball metrics, they are combined with the system performance metrics to provide the simulator or predicted virtual outcome of the real-life pitched ball via an output device such as a display screen. The simulator system can determine and output information within the context of virtual stadiums, such that information like the outcome of the predicted virtual ball hit is determined and visually represented within the specified stadium. The simulator system can store the virtual pitched ball outcome predicted, and the information used to generate the virtual pitched ball outcome, to provide subsequent coaching or training based on the characteristics and tendencies of the real-life pitch and the calculated virtual pitched ball outcome. The stored information can also be used in a gaming module in which one or two players, engaging as real-life pitchers, face off against virtual batters and/or virtual teams.

FIG. 1 illustrates an overhead view of a schematic representation of a batting simulator system 100, according to one arrangement. The batting simulator system 100 includes a ball delivery apparatus 102, such as a pitching machine or live pitcher, and a detector 104 disposed in electrical communication with a computerized device 106. As illustrated, the ball delivery apparatus 102 and the detector 104 can be disposed inside or outside of a batting cage or screen 108.

The detector 104, in one arrangement, is configured to capture a set of images of a ball 110, such as a baseball, as the ball delivery apparatus 102 delivers the ball 110 to a user or hitter 112 and the user 112 hits the ball 110. The detection 104 is also configured to generate a set of measurements associated with the captured image and related to the motion of the ball 110.

Figure 2:
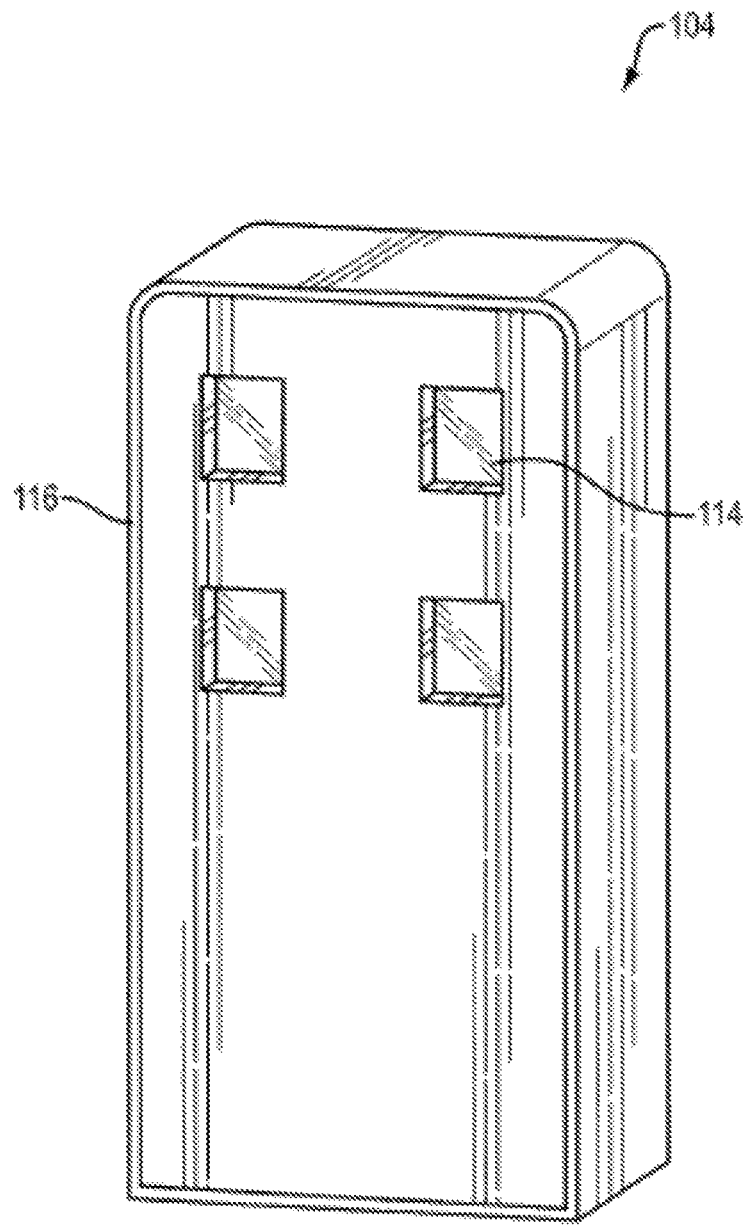
FIG. 2 illustrates an example detector of the batting simulator system of FIG. 1, according to one arrangement.
Figure 3B:
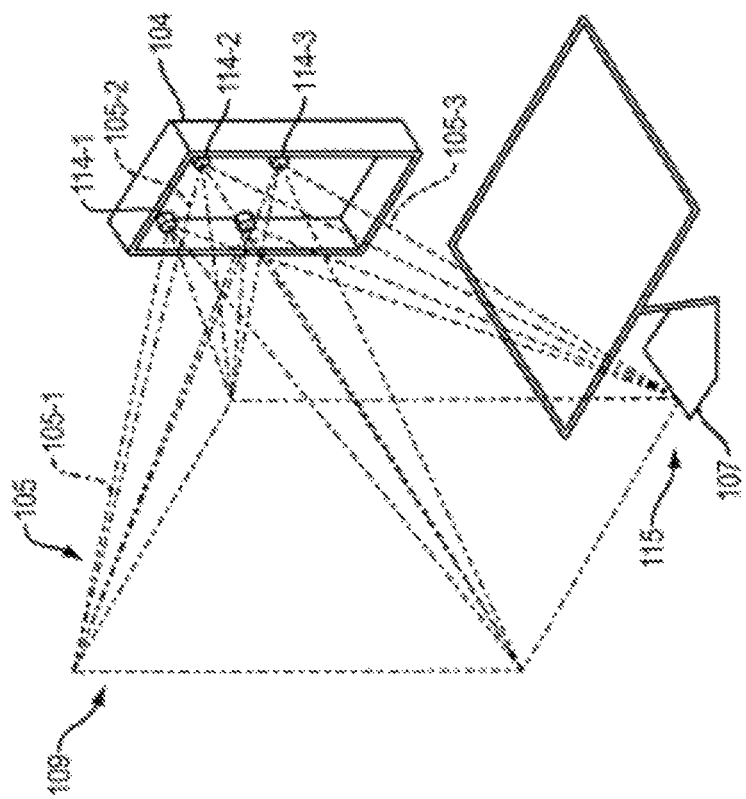
FIG. 3B illustrates a perspective view of the detector of FIG. 2.
Figure 3A:
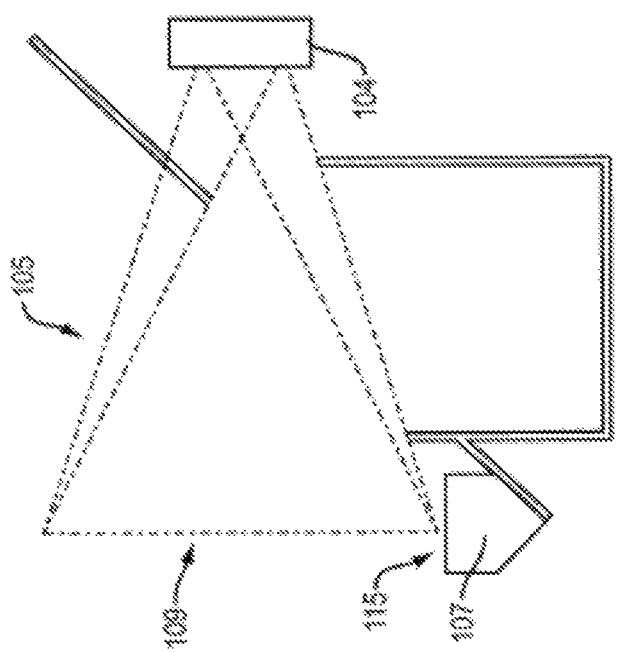
FIG. 3A illustrates an overhead view of the detector of FIG. 2.

In one arrangement, as indicated in FIG. 2, the detector 104 includes a set of cameras 114, such as infrared (IR) cameras, mounted on a rigid frame 116. With reference to FIGS. 3A and 3B, each camera of the set of cameras 114 includes overlapping field of views (FOVs) 105 to capture multiple images of the ball 110 as a result of a user hit. For example, a first camera 114-1 is configured to capture an image in a first field of view 105-1, a second camera 114-2 is configured to capture an image in a second field of view 105-2, and a third camera 114-3 is configured to capture an image in a third field of view 105-3. Taken together, the field of views 105 define a tracking volume 109.

With the cameras 114 mounted in a single compact frame 116, the detector 104 can be positioned relative to user 112 in a relatively short amount of time and in such an orientation that the system 100 can capture data for either a right-handed batter, as shown in FIG. 1, or a left-handed batter. For example, the tracking volume 109 of the detector 104 can be disposed in proximity to a leading edge 115 of home plate 107. Accordingly, with such positioning of the tracking volume 109, the detector 104 can track and collect data for baseballs hit by right-handed or left-handed batters.

Returning to FIG. 1, the computerized device 106, such as a computer having controller 107 including a memory and a processor, is disposed in electrical communication with the detector 104. As will be described in detail below, the controller 107 is configured to receive a set of measurements 138, such as images, of the ball 110 from the detector 104 and detect the trajectory and exit velocity of the ball 110 based upon the set of measurements 138.

In one arrangement, the controller 107 stores a batting simulator application that, when executed by the controller 107, causes the controller 107 to perform the operation of detecting a result of the ball hit. The batting simulator application installs on the computerized device 106 from a computer program product 124. In certain arrangements, the computer program product 124 is available in a standard off-the-shelf form such as a shrink wrap package (e.g., CD-ROMs, diskettes, tapes, etc.). In other arrangements, the computer program product 124 is available in a different form (e.g., propagated signals, a network installation, purchasable and downloadable online media, etc.). In another arrangement, the memory in the computerized device 106 includes an identifier or address, in the form of a URL or the like, which when provided to the computerized device 106 allows the computerized device 106 to acquire the response application from an on-line repository of applications compatible with the computerized device 106.

Figure 4A:
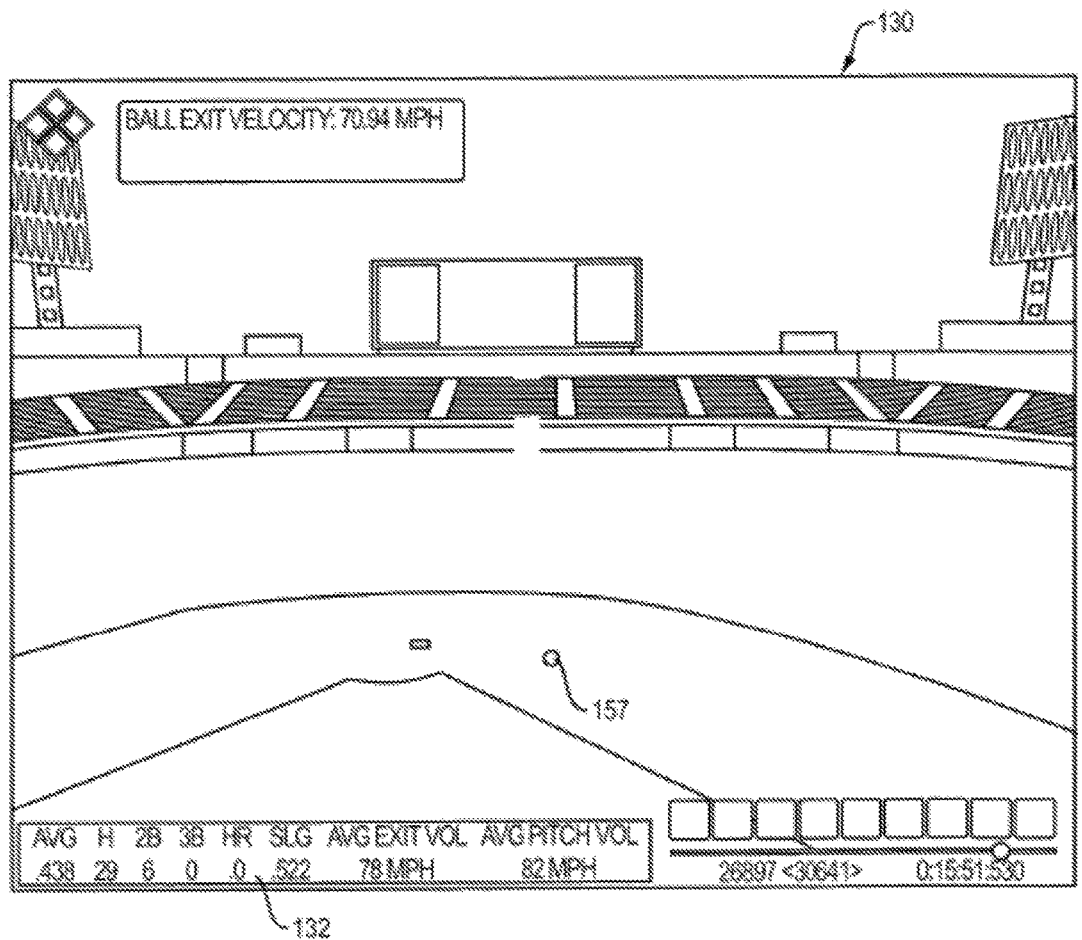
FIG. 4A illustrates a simulated three-dimensional display of a field provided by the batting simulator system of FIG. 1, according to one arrangement.
Figure 4B:
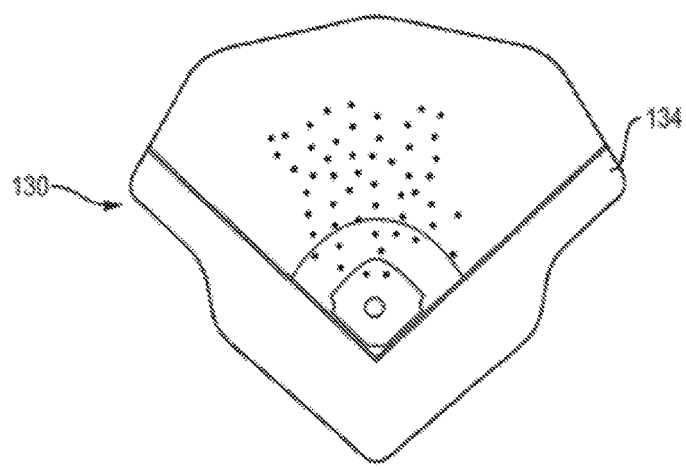
FIG. 4B illustrates an overhead display of a field provided by the batting simulator system of FIG. 1, according to one arrangement.

The computerized device 106 is disposed in electrical communication with an output device, such as a monitor 120. As will be described in detail below, the monitor 120 can provide a display of a virtual field 130, as illustrated in FIGS. 4A and 4B. For example the display 130 of the virtual field can include both a simulated three-dimensional (3D) view of the field 132 (FIG. 4A) and an overhead view 134 (FIG. 4B) of the field. While the output device 120 can be configured in a variety of ways, in one arrangement the output device 120 and the computerized device 106 are housed in a common portable kiosk to allow for easy transport.

Returning to FIG. 1, the computerized device 106 is configured to detect both the incoming ball speed and ball trajectory, such as provided by the ball delivery apparatus 102, and the outgoing ball speed (i.e., exit ball velocity) and ball trajectory after the ball 110 is hit by the user 112. As will be described in detail below, based upon the exit ball velocity, trajectory, and a system performance metric, the batting simulator system 100 can provide the user 112 with the direction and distance of travel of the ball 110 as well as predict the outcome of the hit ball, as in a real-life game scenario.

In use, the computerized device 106 initially receives a set of measurements 138 of a ball 110 associated with a ball hit. For example, during operation, the ball delivery apparatus 102 delivers the ball 110 to the user along direction 140 and in response to a ball hit, the ball travels along a generally opposing direction 150. The cameras 114 of the detector 104 capture and transmit images or measurements 138 of the ball 110 to the computerized device 106 as the ball 110 travels along direction 150 in response to the ball hit.

Based upon the images or measurements 138, the computerized device 106 detects the exit ball velocity 152 and the trajectory 154 (i.e., a first angle of the ball relative to a horizontal reference and a second angle of the ball relative to a vertical reference, such as a vertical reference associated with the user 112) of the ball 110. For example, the computerized device 106 can be configured to utilize image processing techniques that are known in the art to detect the exit ball velocity 152 and the trajectory 154 based upon the received images or measurements 138.

With the exit ball velocity 152 and trajectory 154 of the ball 110 known after impact, the computerized device 106 can determine a virtual ball hit outcome 156 associated with the ball hit. For example, the computerized device 106 can initially detect the direction of travel of the ball and at least one of the horizontal or vertical distance of travel of the ball using a range of trajectory algorithms.

In one arrangement, the following equation provides the horizontal distance the batted ball travels after impact:

$$d = \frac{v\cos\theta}{g}\left(v\sin\theta + \sqrt{(v\sin\theta)^2 + 2gy_0}\right)$$

where the variables are provided as:
  g: the gravitational acceleration;
  θ: the angle at which the batted ball is launched;
  v: the exit ball velocity after impact;
  $y_0$: the initial height of the ball at impact; and
  d: the total horizontal distance travelled batted ball.

Based upon the exit ball velocity 152 and trajectory 154 and as indicated in FIGS. 1 and 4A, the computerized device 106 can determine a virtual endpoint location 157 of the hit ball (i.e., a virtual hit ball), such as if the horizontal distance travelled by the hit ball results in a ground ball to the second baseman or a deep fly to centerfield. For example, in the case where the exit ball velocity 152 is relatively low and the trajectory 154 is relatively shallow, the computerized device 106 can detect virtual distance travelled (d) by the hit ball as being relatively short. Accordingly, based upon the detected distance, the computerized device 106 can detect the virtual endpoint location 157 of the virtual ball as being an infield location and can classify the virtual ball hit outcome 156 as being a ground ball. However, in the case where the exit ball velocity 152 is relatively high and the trajectory 154 is relatively steep, the computerized device 106 can detect virtual distance travelled (d) by the hit ball as being relatively large. Accordingly, based upon the detected distance, the computerized device 106 can detect the virtual endpoint location 157 of the virtual ball as being an outfield location and can classify the virtual ball hit outcome 156 as being a deep fly to centerfield.

Additionally during use, the computerized device 106 is configured to combine the detected trajectory 154 and exit ball velocity 152 (e.g., the virtual endpoint location 157) with a system performance metric 160 to generate the virtual ball hit outcome 156 and to output the virtual ball hit outcome 156 on an output device 120. The computerized device 106 utilizes the system performance metric 160 to predict real-life outcome of the hit (e.g., if the hit is an out, single, or home run) based upon the received measurements 138. It should be noted that the computerized device 106 can be preconfigured with the system performance metrics 160, such as where the controller 107 stores the system performance metrics 160. Alternately, a user, such as a batter or a coach, can input the performance metric 160 into the computerized device 106 prior to, or while, the batter 112 hits balls 110 from the ball delivery apparatus 102.

The system performance metric 160 can be configured in a variety of ways. The following provides examples of various configurations of system performance metrics 160 utilized by the computerized device 106.

Figure 5:
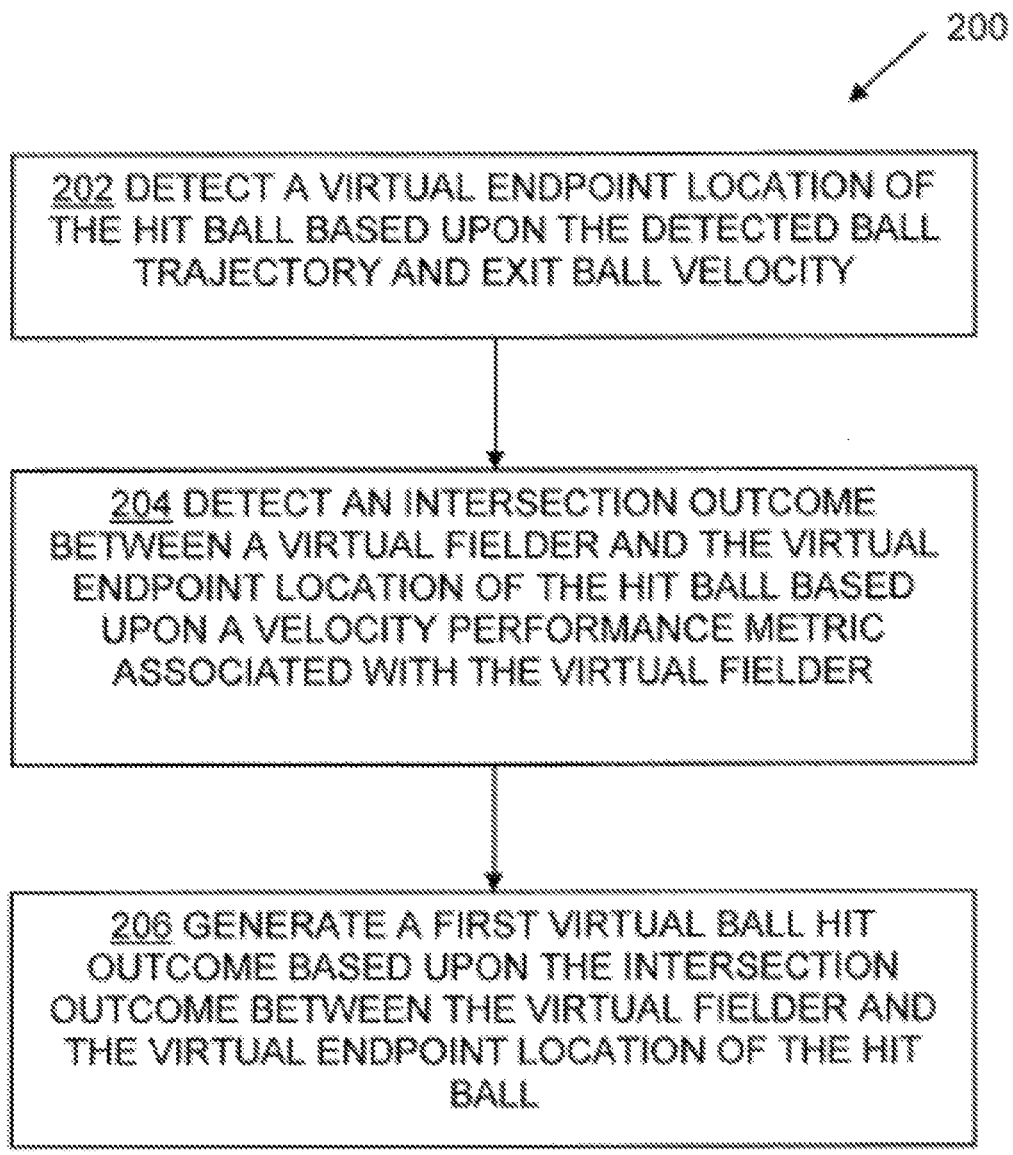
FIG. 5 is a flowchart of a procedure performed by the computerized device of FIG. 1, according to one arrangement.

In one arrangement, the system performance metric 160 can affect the virtual ball hit outcome of the batted ball. For example, the computerized device 106 applies a set of system performance metrics 160 associated with a virtual fielder to the exit velocity 152, trajectory 154, and/or an endpoint location of the hit ball to affect the virtual ball hit outcome 156 (e.g., whether a single, double, or out) of the hit. FIG. 5 is a flowchart 200 illustrating a process performed by the computerized device 106 when combining the detected trajectory 154 and exit ball velocity 152 with the system performance metric 160 to generate the virtual ball hit outcome 156.

In step 202 and as described above, the computerized device 106 detects a virtual endpoint location 157 of the hit ball based upon the detected ball trajectory 154 and exit ball velocity 152. For example, based upon the exit ball velocity 152 and trajectory 154, the computerized device 106 can determine the virtual endpoint location 157 of the hit ball as corresponding to a center field location.

In step 204, the computerized device 106 detects an intersection outcome between a virtual fielder and the virtual endpoint location 157 of the hit ball based upon a velocity performance metric associated with the virtual fielder. For example, the computerized device 106 can be configured with a database of fielder performance metrics associated with a virtual fielder, such as the virtual fielder's reaction time in response to a ball hit and running speed. By knowing the position (e.g., center field) of the virtual fielder, the reaction time and speed of the virtual fielder as the virtual fielder's performance metric 160, as well as the virtual endpoint location 157 of the hit ball (i.e., based upon the detected trajectory 154 and speed 152 of the ball), the computerized device 106 can determine the time and place that the virtual fielder intersects with the trajectory of the ball (e.g., the outcome of the ball hit).

In step 206, the computerized device 106 generates a first virtual ball hit outcome 156 based upon the intersection outcome between the virtual fielder and the virtual endpoint location 157 of the hit ball. For example, based upon the fielder performance metrics and the calculated virtual endpoint location 157, if the intersection between the virtual fielder and the virtual endpoint location 157 of the hit ball occurs while the ball is in flight, then the computerized device 106 can detect the outcome 156 as being an out. If the computerized device 106 detects that an intersection of the virtual endpoint location 157 of the hit ball and virtual fielder occurs after the ball has struck the ground then, the computerized device 106 can utilize additional performance metrics to determine the outcome.

Figure 6:
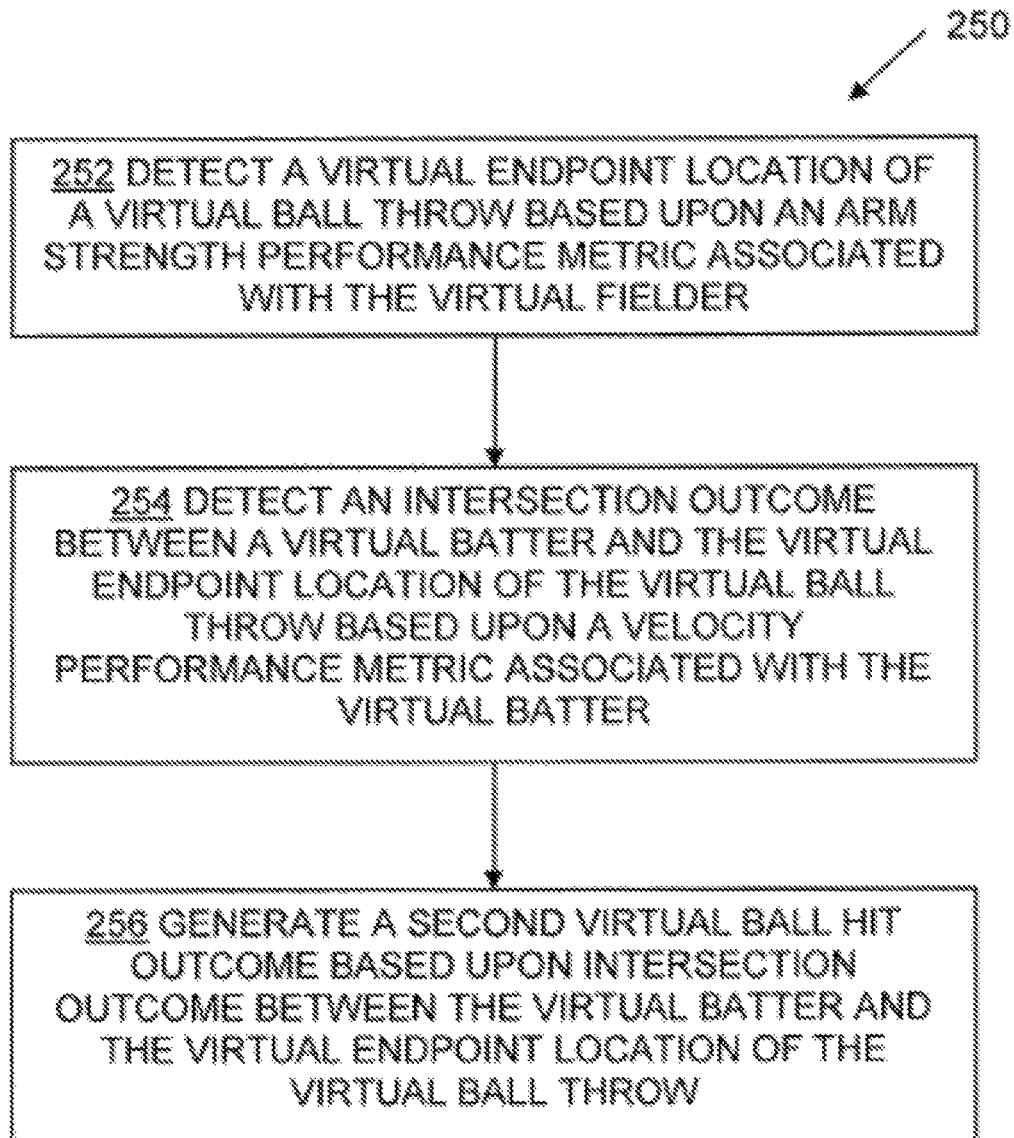
FIG. 6 is a flowchart of a procedure performed by the computerized device of FIG. 1, according to one arrangement.

In one arrangement, the system performance metrics 160 can affect the virtual ball hit outcome of a ball fielded by the virtual fielder. For example, FIG. 6 is a flowchart 250 illustrating a process performed by the computerized device 106 that takes the virtual fielder's arm strength into account, as well as the batters speed to first base, second base, third base or home plate.

In step 252, the computerized device 106 detects a virtual endpoint location 157 of a virtual ball throw based upon an arm strength performance metric associated with the virtual fielder. For example, the computerized device 106 can be configured with a database of fielder performance metrics associated with a virtual fielder, including the virtual fielder's arm strength, as indicated by a thrown ball velocity. Accordingly, the outcome of a thrown ball by a virtual infielder can depend on the time it takes for the infielder to reach the ball (e.g., as calculated by the computerized device 106 from the fielder's reaction time and speed) plus the velocity at which he throws the ball to first base (e.g., the arm strength performance metric). As indicated above, the computerized device 106 can access this data via the virtual fielder database, for example.

In step 254, the computerized device 106 detects an intersection outcome between a virtual batter and the virtual endpoint location 157 of the virtual ball throw based upon a velocity performance metric associated with the virtual batter. For example, the computerized device 106 can be configured with a database of batter performance metrics associated with the batter, such as the batter's base running speed. By knowing the distance between the virtual batter and the bases and the speed or velocity performance metric of the virtual batter (i.e., base runner) as taken from the database, the computerized device 106 can determine the time that the virtual batter can reach a base, such as first base, following a ball hit.

In step 256, the computerized device 106 generates a second virtual ball hit outcome based upon intersection outcome between the virtual batter and the virtual endpoint location 157 of the virtual ball throw. For example, if the intersection outcome between the virtual batter and the virtual endpoint location 157 of the virtual ball throw indicates that the ball thrown by the virtual fielder reaches first base before the virtual base runner then the second virtual ball hit outcome is an out. However, if the intersection outcome between the virtual batter and the virtual endpoint location 157 of the virtual ball throw indicates that the runner beats the virtual fielder's throw, then the second virtual ball hit outcome or ruling is a base hit.

While the performance metric 160 of the virtual fielder can be based upon speed and arm strength, a number of other factors can contribute to the virtual fielder performance metric 160. In one arrangement, the performance metric 160 associated with the virtual fielder is based upon the fielder's age. For example a 12 year old player will be typically slower than an 18 year old player. In one arrangement, the user 112 can select the age group he would like to compete against and input that age to the computerized device 106. Based upon the selected age group, the computerized device 106 can apply a corresponding performance metric 160 related to that age group to the exit ball velocity and trajectory of the virtual ball and provide a corresponding outcome of the hit (e.g., single, double, etc.) as outlined above. The performance metric 160, accordingly, factors in the slower running speed and arm strength of a relatively younger virtual fielder against the virtual batter to determine the likely outcome.

In another arrangement, the computerized device 106 applies a system performance metric 160 associated with the user or hitter to the exit ball velocity 152 and trajectory 154 of the ball 110. For example, the system performance metric 160 relates to the speed of the batter, based upon the age group the user selects for the batter. In use, before starting a hitting session the user 112 inputs the desired age group to the computerized device 106 to set the running speed of the fielders, as well as the virtual fielder's arm strength, for example. Based upon the particular, selected age group, the computerized device 106 can apply a corresponding performance metric 160 against the exit ball velocity and trajectory of the ball 110 and provide a corresponding outcome of the hit (e.g., was the user fast enough to make a single, double, etc.). In another arrangement, the computerized device 106 applies the same running speed to the virtual batter/base runner when determining the outcome of a hit to minimize the ability of the users from selecting one age group for the fielders while selecting another age group for the base runners.

Returning to FIG. 1, in one arrangement, the system performance metrics 160 can be configured as an environmental performance metric 170 utilized by the computerized device 106 to adjust at least one of the ball trajectory 154 and exit ball velocity 152.

For example, the computerized device 106 is configured to apply environmental factors 170 to the exit velocity 152 and trajectory 154 of the virtual ball, or to the virtual ball hit outcome 156, to mirror a real-life outcome of the hit. These factors 170 can include wind direction, humidity level, temperature or other weather conditions, and altitude. In one example, the computerized device 106, can apply wind direction as the environmental factor 170 to adjust the virtual ball hit outcome 156 (e.g., adjust the horizontal and vertical distance of travel) for a particular hit ball. In another example, altitude can affect the drag coefficient on the ball following a ball strike. In such a case, a stadium located in higher altitudes like Denver will have an air density roughly 80% of stadiums located at sea level, such as at Miami. Accordingly, the computerized device 106 can adjust the horizontal and vertical distance of travel of the virtual ball such that a hit ball with a given exit ball velocity 152 and trajectory 154 will travel further in Denver compared to Miami. In one arrangement, the environmental factors 170 can be randomly generated by the computerized device 106 or can be provided by the user 112.

In one arrangement, the turf material of baseball field can act as an environmental factor 170 to affect the outcome of the virtual ball. For example, the computerized device 106 can account for the conditions of the playing field, as the environmental factors 170 to adjust the virtual ball hit outcome 156 of the virtual ball and simulate, for example, play on real grass or artificial turf. For example, certain baseball fields such as domed stadiums use artificial turf. In these cases, the ball will react in a different manner compared to play on real grass due to varying coefficient of friction between the two surfaces. In this case, the computerized device 106 can adjust the coefficient of friction according to the stadium's surface type and incorporate these parameters into the virtual ball hit outcome 156. The virtual weather conditions can be randomly generated by the computerized device 106 or can be provided by the user 112.

In another example, the geometry of the baseball field itself can act as an environmental factor 170 to affect the outcome of the virtual ball. For example, what might be a home run in Fenway Park may result in a fly ball out in Yankee Stadium. Accordingly, the user can select a particular baseball field and, based upon the geometry and dimensions of the baseball field, the computerized device 106 can apply the baseball field's geometry to the exit ball velocity and trajectory of the ball 110 to predict real-life outcome of the hit. For example, to enhance the user's experience, the computerized device 106 can place the virtual batter inside a Major League Stadium via the display 120 and have the user's hits projected to the field dimensions of that specific ballpark. The computerized device 106 can also show the results of the hit via the display 120 (e.g., Home Run—410 ft.).

After the player 112 has hit the ball 110, the computerized device 106 can display the virtual ball hit outcome 156 on the output device 120. During operation and with reference to FIG. 4A, the computerized device 106 is configured to display the speed and location of the pitched ball (not shown) along with the speed 152, trajectory 154, and calculated distance of the batted ball (e.g., the virtual ball hit outcome 156) via the monitor 120. For example, within a second of impact, the monitor 120 can display a reasonable simulation of the path of the ball 110 traveling through the virtual stadium 132. This will give the batter an out-of-the-batting-cage view of where the ball would have landed had it not been confined by a screen seven feet from the batter's box. Additionally, the computerized device 106 and monitor 120 can display a virtual batter (not shown), representing the user 112 inside a Major League Stadium, and show the player's hits projected to the field dimensions of that specific ballpark. Furthermore, in addition to the 3D view of the virtual field, the computerized device 106 can provide an overhead two dimensional (2D) view of the field as illustrated in FIG. 4B and can display the exact location of the batted ball.

With continued reference to FIG. 1, following the generation of multiple, virtual ball hit outcomes, the computerized device 106 is configured to generate a set of hitting session statistics 174 based upon the set of outcomes 156. Statistics 174 from hitting sessions provide the user with information that can be used to improve the player's performance (i.e., by showing deficiencies in the players swing, stance, etc.). For example, the computerized device 106 is configured to display, as the statistics 174, key performance indicators (KPIs) such as total distance, bat speed, and exit ball velocity for a single ball hit or for a set of ball hits. The computerized device 106 can also be configured to compile and display statistics 174 to the batter in real-time in order to provide the out-of-the-batting-cage results, as if the batter was playing a live game on an actual field. The computerized device 106 can also be configured to upload the statistics 174 to a secondary device 182, such as a database (e.g., either onsite or remotely hosted over the network 180) for analysis with software applications. These statistics 174 can be viewed per individual batting session or grouped together by date for a more comprehensive analysis. The statistics 174 can also be viewed for individual players or by groups or teams.

The computerized device 106 is configured to provide a variety of types of statistics 174 to the user to provide information regarding a variety of hitting metrics associated with the batter 112.

In one arrangement, the computerized device 106 of the batting simulator system 100 is configured to provide statistics associated with the virtual ball hit outcome 156 to the batter 112 in real-time. For example, as described above, the computerized device 106 is configured to determine if a ground ball is a single or an out or whether a fly ball is a home run or a long out to the right fielder. With this information, computerized device 106 can generate statistics 174 for each hitting session with individual hitting sessions compiled in a database for an entire season. As the game of baseball relies heavily on such statistics 174, this information is extremely valuable, as the player 112 can use the statistics 174 to perfect his swing mechanics or to chart his progress over a period of time.

In one arrangement, the computerized device 106 is configured to track and output statistics 174 related to pitch velocity, bat swing velocity, and batted ball velocity. For example, generally, the faster the batter swings the bat, the further the ball will travel. Accordingly, the computerized device 106 is configured to calculate and display the pitch speed, bat speed for each swing, and the exit velocity of the batted ball. By knowing the exit velocity of the batted ball as the output statistic 174, the batting simulator system 100 can keep track of hard hit balls over the course of the batting session or season. For example, line drives indicate that the batter is hitting the ball on the sweet spot of the bat and can increase or improve the batter's overall batting statistics. A hard hit can be defined by the elevation angle of the batted ball from the horizon and the height/distance ratio of the trajectory.

In one arrangement, the computerized device 106 is configured to track and output statistics 174 related to the pitch location with respect to the batter's strike zone. For example, as indicated above with respect to FIGS. 3A and 3B, the detectors 104 are configured to detect the motion of the pitched ball 110 within a set of fields of view 105. Within the volume defined by the fields of view 105 and with reference to FIG. 7, the computerized device 106 defines a strike zone 300 having a set of strike zone sections 302. For example, the area of the strike zone 300 is defined as the distance between the batter's shoulders and knees and the distance between the outer edges of home plate 107. While the strike zone 300 can have any number of sections 302, in one arrangement, the strike zone includes nine substantially square-shaped inner sections and four substantially L-shaped peripheral sections. During operation, by knowing the exact location of the ball 110 within the fields of view 105 relative to the strike zone 300 and by knowing the resulting virtual outcome of the ball following the hit (strike, single double, etc.), the computerized device 106 can generate ball hit statistics 174 on a per strike zone section basis.

Figure 7:
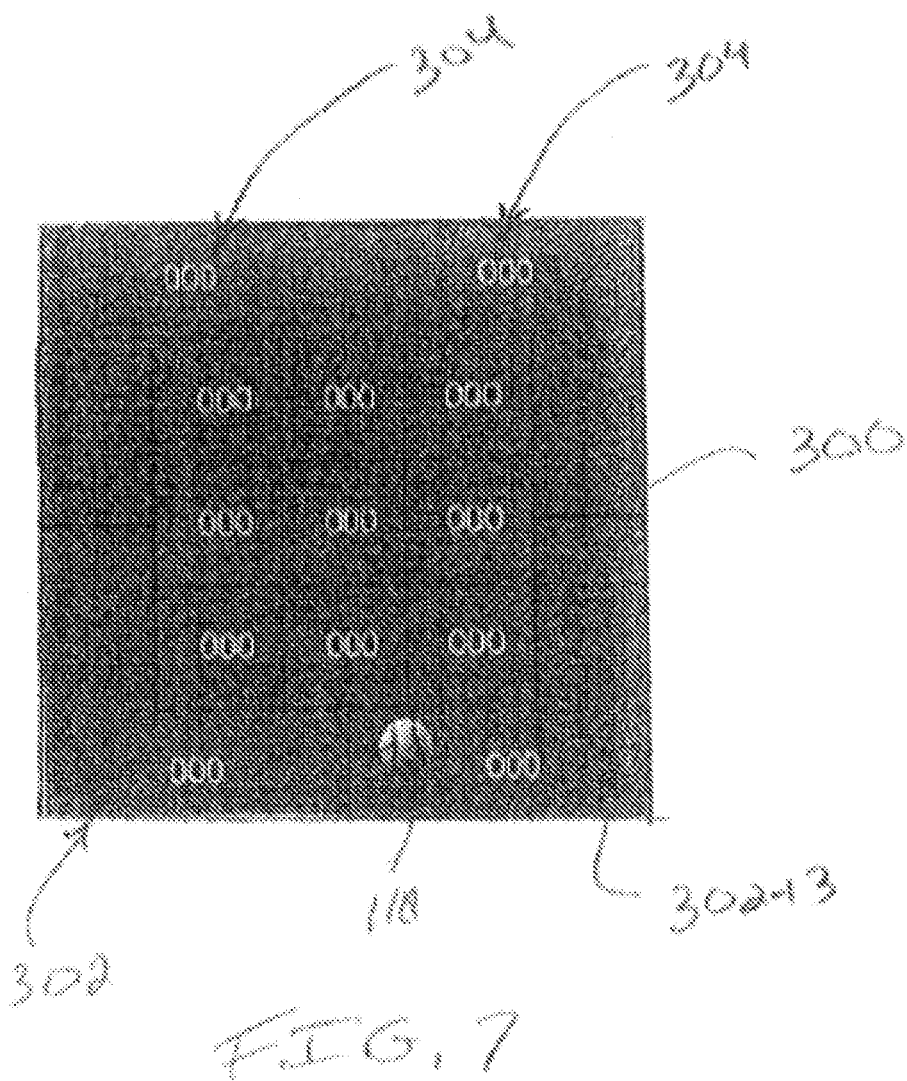
FIG. 7 illustrates an example of a strike zone grid generated by the batting simulator system of FIG. 1, according to one arrangement.

During operation, the computerized device 106 is configured to detect a location of the ball 110 associated with a ball hit within a strike zone section 302 of a strike zone 300. In one arrangement, based upon the measurement 138 received from the detector 104 relating to a ball hit location within the detector's field of view 105 as well as the defined strike zone 300, the computerized device 106 can detect the positioning of the hit ball within a strike zone section 302. For example, as indicated in FIG. 7, the computerized device 106 can detect the hit ball 110 as being located within the strike zone section 302-13.

Next, for each strike zone section of the set of strike zone sections 302, the computerized device 106 is configured to output a hit ball metric 304 associated with a ball hit by the batter. In one arrangement, the computerized device 106 can output the hit ball metric 304 for each strike zone section 302 via the output device or monitor 102 of the system 100. For example, the computerized device 106 can display the strike zone 300 and related strike zone sections 302 as well as the a hit ball metric 304 associated with each strike zone section 302.

While the hit ball metric 304 can be configured in a variety of ways, in one arrangement, the hit ball metric 304 relates to the corresponding batting average or average exit ball velocity per strike zone section 302. This will provide valuable information to the coach player as it identifies possible deficiencies in the player's swing and overall mechanics.

In one arrangement, the batting simulator system 100 provides, as part of the statistic output 174, spray charts, such as indicated in FIG. 4B. Spray charts are typically used by hitters 112 to determine hitting tendencies and identifying flaws in their mechanics or general hitting approach. By knowing the location and distance traveled for each hit, the system 100 can provide these charts by session or over the course of an entire season. The player 112 will have the ability to view singles, doubles, triples, home runs, and outs. They can also view statistics like fly ball to ground ball ratios. In one arrangement, when coupled with the tracking of pitch location with respect to a batter's strike zone, the computerized device 106 can generate spray charts for batted balls for each section 302 of the strike zone 300. This information is valuable as it can help determine if a player's approach to hitting an outside pitch is effective.

In one arrangement, the batting simulator system 100 can interact with other computerized devices over a network 180 to share statistics 174. As illustrated in FIG. 1, the computerized device 106 is configured to communicate over the network 180 with one or more server devices 182 which can host a website configured to serve as a portal for the player 112 to generate and review their statistics from a single batting session or form a collection of batting sessions representing an entire season. For example, the player 112 can upload statistics from the computerized device 106 to a server device 182 over time. The player 112 can later visit their personal statistics page of the website hosted by the server 182 to retrieve individual player reports. For example, the user can login to the website by entering their unique player ID and pass code. From there, the player 112 can download his individual statistics 174 for their last session, an entire season, or their career.

In one arrangement, the server 182 can provide data allowing the player 112 to analyze the location of ground balls or outs via spray charts, review average bat speed per session, and analyze their batting average over the course of the entire season. For example, the server 172 can report batting averages, singles, doubles, triples, home runs, slugging percentages, swing to miss percentages (SMP), number of hard hit balls, average pitch velocity, back to the player 112 and coach to monitor the player's progress. In addition to the batting statistics, the server 172 is configured to allow the player to define the spray charts by selecting to view singles, doubles, triples, home runs, outs, ground balls, fly balls or all of the above. By monitoring the player's bat speed for each hit during each batting session, the server 172 can provide charts that show the average and progression of bat speed over the course of time. In one arrangement, this data is provided to the player 112 for a fee.

In one arrangement, the website is configured to offer members collective statistical information. For example, the player 112 can review the overall hitting leaders in select age groups or review the latest hitting tips from a professional coach. Additionally, the website can provide additional collective statistical information, provided as follows.

In one arrangement, the website can be configured to provide a dashboard for regional or national batting leaders for certain categories (BA, HR's) of particular age groups. In one arrangement, the website can be configured to promote upcoming events (e.g. hitting clinics, home run derbies, sports venues, etc.) at customer sites. In one arrangement, the website can be configured with a live chat room or user blog where members can discuss a variety of topics including hitting techniques, swing mechanics, or the latest news from Major League Baseball.

Furthermore, in one arrangement, the website can be configured with advertising space for local or national retails stores and with player profile information to highlight members that are achieving success on and off the field. In one arrangement, the website can be configured to post interviews from coaches on the latest batting and training techniques. The information can be gathered directly from the coaches or from presentations at national conferences. In one arrangement, the website can be configured with a Facility Portal to allow organization of hitting clinics, home run derbies, and simulated games. The facility will need to enter in their account name and password. Once entered, they will be brought to a page where they can either start an event or gather group statistics on current or past events. Payment for the events will be processed via this portal. In one arrangement, the website can be configured with a Player Portal configured to serve as the entry point to gather the individual player statistics. The player 112 will need to enter in their username and password to gain access to their updated stats. The player 112 can purchase credits for future downloads via this portal or subscribe to our monthly or yearly packages.

As indicated above, the batting simulator system 100 is configured to collect exit ball velocity, ball trajectory, and outcome data and provide a virtual ball hit outcome of the hit as well as statistics relating to the batter's performance. In one arrangement, the batting simulator system 100 is configured to provide these functions as part of a game, such as a video game. In one arrangement, the computerized device 106 is configured as a gaming module. For example, the computerized device 106 can be configured to execute a baseball defense based upon the virtual outcome 156 of a batted ball. With such a configuration, players and/or teams can utilize the system 100 to compete against the defense provided by the computerized device 106. In one arrangement, the computerized device 106 can execute a baseball defense algorithm, such as based on artificial intelligence gathered from generally accepted baseball strategies and tactics, to determine the correct defensive play for any given circumstance. For example, the computerized device 106 can determine if the defense should execute a double play with virtual base runners on first and second rather than prevent the virtual base runner on second base to advance to third.

In one arrangement, the system 100 is configured to run simulated games between two teams against a common virtual defense. The games can use an automated pitching machine or a live pitcher from the opposing team.

In one arrangement, the system 100 is configured to network simulated games, such as over the network 180 so that teams from different facilities can play against each other. For example, home run derby contests can be played between players (in same building or networked over the internet) in virtual stadiums.

While various embodiments of the innovation have been particularly shown and described, it will be understood by those skilled in the art that various changes in form and details may be made therein without departing from the spirit and scope of the innovation as defined by the appended claims.

As indicated above, the computerized device 106 is configured to provide a display of a virtual field 130, as illustrated in FIGS. 4A and 4B. In one arrangement, in addition to the virtual field 130, the computerized device 106 is configured to display virtual fielders that interact with a virtual hit ball after the user hits the ball 110 from the ball delivery apparatus 102.

As indicated above, using the fields of view 105 provided by the detector 104, the computerized device 106 is configured to detect a location of the ball 110 associated with a ball hit within a strike zone section 302 of a strike zone 300. In one arrangement, the computerized device 106 is also configured to utilize the fields of view 105 provided by the detector 104 to detect points of impact on user's bat (e.g., the sweet spot or at the portion of the bat having the largest diameter). A ball hit on the sweet spot of the bat typically travels faster than a ball hit from other locations of the bat, thus increasing the likelihood of a base hit. Accordingly, by detecting points of impact on user's bat and providing corresponding statistics to the user, the user can adjust his swing mechanics to hit the ball on the sweet spot of the bat and increase his hitting percentage.

In one arrangement, the system 100 is configured with the ability to add sensors on either the batter 112 to analyze actual swing mechanics (e.g. power 'L') or on the pitcher to analyze pitching motion. This could be done with either optical sensors using the same cameras of the detector 104 or sourceless inertial sensors.

As described above, based upon the exit ball velocity 152 and trajectory 154 of the hit ball 110, the computerized device 106 can determine a virtual endpoint location 157, such as within a virtual field. It should be noted that in the event that the batter 112 swings and does not contact the ball (e.g., following a ball strike), the computerized device 106 is configured to remain in operational mode ready to collect data from the next pitch or hit and display the results accordingly. Accordingly, the batting simulator system 100 does not require dedicated personnel for operation.

As described above, with reference to FIG. 1, the computerized device 106 is configured to detect both the incoming ball speed and ball trajectory, such as provided by the ball delivery apparatus 102, and the outgoing ball speed (i.e., exit ball velocity) and ball trajectory after the ball 110 is hit by the user 112. In one arrangement, such as when a human pitcher pitches the ball to the batter 112, the computerized device 106 associates the incoming ball speed and ball trajectory (e.g., location in the strike zone) with the virtual ball hit outcome 156 to develop pitcher-based statistics during a session. For example, based on the location of the ball within a strike zone and the ball's velocity, a pitcher can determine the percentage of pitches that resulted in line drives versus fly balls.

In another exemplary embodiment of the system simulator 100 illustrated in FIG. 1, the simulator 100 can be configured to make determinations about real baseball outcomes following a user pitching the ball without having a live batter. In such instances, components for purposes of measuring hit ball information can be replaced by components for purposes of measuring pitched ball metrics. As a result, the system simulator 100 can be configured to provide a simulated pitching game of baseball, softball, or the like.

In the system simulator 100 adapted for use with live pitchers to make real life baseball determinations, ball delivery is provided using a live pitcher 102, and the detector 104 can be communicatively coupled to the computerized device 106. It should be understood that the live pitcher 102, detector 104, and/or computerized device 106 can be disposed within or outside of a pitching cage or screen 108. It should also be understood that components of the simulator 100 can be housed together or embedded with one another, or can share hardware or software resources such as a processor and memory. For example, in some embodiments, the computerized device 106 can be housed together and share a processor and memory with the detector 104.

As described above in further detail in connection with FIG. 1, the detector 104 includes a set of cameras 114 configured to visualize and capture images of a real-world ball as it is pitched, and to measure attributes of the pitched ball based on the visualization and captured images. The cameras 114 are positioned relative to the live pitcher 102 and/or plate 107 in a manner that allows for a pitched ball to be imaged at least from the time the ball is released by the pitcher to the time the ball crosses the plate—e.g., at the furthermost point from the pitcher. The positioning of the cameras 114 provides the same range of imaging of the pitched ball regardless of whether the pitcher 102 is right-handed or left-handed. Moreover, the position and/or angle of the cameras 114 relative to the pitcher 102, to the mound or area where the pitcher stands, or to the plate 107 can remain constant, for example, during a single pitch, a series of pitches, or a simulated game. The measured attributes of the real-life ball are used to predict a virtual pitched ball outcome, as described in detail below in connection with flow chart 800 illustrated in FIG. 8. Alternatively, the system can be auto-calibrated based on one or more known reference points (e.g., home plate) to auto-align the camera(s) to the tracking volume. As a result, one or more camera(s) can be moved during use without impacting the metrics or outcome of the system and process.

As shown in FIG. 8, at step 850, the cameras 114 image a pitched ball during a real-life pitch. In some embodiments, a "pitch" refers to a time starting from when a ball is released by the pitcher 102 until a time that the ball crosses home plate 107. It should be understood that the process of imaging described at step 850 refers to a high rate imaging or filming of the ball, in which images are captured at a sufficiently high number of frames per second (fps) (e.g., >100 fps, 210 fps, 420, fps, 1000 fps, >1000 fps) based on or exceeding a determined threshold. In some embodiments, the cameras 114 further capture images of the ball during the time that the ball is gripped by the pitcher 102 as the pitcher is in a wind-up motion until the ball is released or pitched. The images captured by the cameras 114 are transmitted to the computerized device 106 over a wired or wireless connection.

The computerized device 106, at step 852, calculates metrics of a given real-life pitch. It should be understood that in some embodiments, the cameras 114 can calculate the metrics of the pitch and then transmit those metrics to the computerized device 106. In the present embodiment, however, the computerized device 106 performs the calculation of metrics. Non-limiting examples of the metrics of a pitch include its speed, location, movement, spin, movement (e.g., break or fade and/or rise or fall), etc. The metrics of the pitch can be calculated by using the captured images to identify attributes of the pitched ball (e.g., speed, location, spin, movement (e.g., (break or fade and/or rise or fall), etc.) throughout the pitch sequence or at one or more points during the pitch sequence. In some embodiments, the metrics of the pitch refer to a maximum, minimum, or average of the ball's metrics throughout the pitch, such that, for example, a pitched ball measured as having a first speed upon release and a second speed upon crossing the plate 107 is deemed to have a speed metric equaling the average of the first speed and the second speed.

In some embodiments, the metrics of the pitch refer to the real-life pitched ball's metrics measured at a particular time during the pitch, such as the time the ball crosses the plate 107. In such an embodiment, the images of the real-life pitched ball captured at step 850 are used to calculate, among other attributes, the horizontal and/or vertical location of the ball relative to the plate 107 at the time the ball crosses the plate 107 (e.g., toward the bottom of the strike zone and on an outside edge of the plate). Other metrics such as the speed of the ball, its spin, its movement (e.g., break or fade and/or rise or fall), etc. can be calculated also at the time that the ball crosses the plate 107. The time at which the location and other metrics are determined can be at any location along the trajectory of the pitch as it approaches, crosses, and passes through the plate. A person skilled in the art will recognize how additional data related to where a hitter typically contacts the ball can be applied to the system to determine the location at which this information should be identified for use in making subsequent swing/hit determinations. For example, the system may identify particular pre-identified hitters (e.g., a thirteen year old boy, Miguel Cabrera, etc.) as a hitter who stands towards the back of a batter's box and therefore typically makes contact at some point later than when the ball first crosses home plate. In such instances, the system can account for the time at which the hitter typically makes contact with the ball when applying the pitch and system performance metric data.

In turn, at step 854, the computerized device 106 predicts a virtual outcome of the pitched ball (also referred to as a "virtual pitched ball outcome") by applying system performance metrics of a virtual batter (and, optionally, system performance metrics of the virtual batter as a base runner) to the pitch metrics calculated at step 852. A virtual pitched ball outcome refers to the predicted and/or likely result of the real-life pitch imaged at step 850 based on hypothetical information relating to the virtual batter (also referred to as "virtual batter system performance metrics") that could have an effect on the result of the real-life pitch. Non-limiting examples of virtual pitched ball outcomes include a hit, out, foul ball, strike, or ball. The virtual pitched ball outcome can be more specific as well, including but not limited to information identifying the type and location of a hit (e.g., single to shortstop, double to left field, home run to center field, etc.), the type and location of an out (e.g., ground out third-to-first, line out to second, fly out right field, etc.), the type and location of a foul ball (e.g., pop-up to the catcher but dropped, caught by the catcher for a third strike, fly ball to the left fielder and caught, fly ball to the left field but out of reach), and the type of strike (e.g., swing-and-miss in the strike zone, swing-and-miss out of the strike zone, looking). It should be understood that any possible real-life result of a ball after being pitched in a real-life baseball, softball, or similar sporting scenario is contemplated.

Still with reference to step 854, the virtual pitched ball outcome is determined using, at least, the system performance metrics of a specified virtual batter. A virtual batter is a digital representation of a real person or a hypothetical construct of a person generated using demographic information (e.g., age, gender, height, weight) and/or baseball-related attributes (e.g., baseball player vs. softball player, hitting power, bat speed). In some embodiments, the hypothetical construct of the person can be a generalization of a type of person or persons, such as a thirteen year old boy, a male professional baseball third baseman, a male single-A baseball left fielder, a female Division III college softball shortstop, etc. System performance metrics of virtual batters include any data related to a real or hypothetical hitter's personal characteristics and/or baseball-related hitting characteristics. Non-limiting examples of system performance metrics of a virtual hitter include age, batting side (e.g., left, right, switch hitter), strength, weight, height, and hand speed. A virtual batter can also be associated with virtual base runner system performance metrics. These metrics refer to demographic or baseball-related characteristics of a virtual batter once the virtual batter enters a base running scenario—e.g., after hitting the ball. Non-limiting examples of system performance metrics for a virtual base runner include age, weight, height, running speed, propensity to run extra bases, sliding ability, etc.

The system performance metrics of a virtual batter (and/or base runner) can be input and/or can be retrieved from a communicatively coupled memory for a single pitch, an at-bat, a series of pitches, or a virtual game. System performance metrics of a virtual fielder and environmental factors, which are described below in more detail with reference to step 856, can be retrieved and/or input similar to the system performance metrics of a virtual batter. In some embodiments, the system performance metrics are input and/or retrieved prior to the start of a pitch. For instance, specific input system performance metrics can be provided using known input devices of the computerized device 106, such as a keyboard, mouse, touchscreen, microphone and the like. In one exemplary scenario, a pitching instructor can input system performance metrics of the virtual batter that the real-life pitcher would like to face, including for example the virtual batter's age, strength, and/or batting side (e.g., right, left). On the other hand, retrieved system performance metrics can be requested and/or retrieved from a memory based on an automated selection by the computerized system 106 or a manual selection by a user. The memory is a memory of the computerized system 106 or a third party storage system, which can include databases of locally obtained system performance metrics and/or system performance metrics obtained by or from other simulators or real-life games played in amateur and professional leagues such as Major League Baseball (MLB). In one exemplary scenario, retrieved system performance metrics can include the metrics associated with a particular MLB player. Non-limiting examples of compilations of system performance metrics are the HitTrax databases, owned by InMotion Systems, LLC of Northborough, Mass., that measure and store offensive and defensive performance metrics.

Still with reference to step 854, the computerized device 106 determines the virtual pitched ball outcome of the real-life pitch based on or by applying the selected system performance metrics. The virtual pitched ball outcome can be determined, for example, by correlating or matching the metrics of the real-life pitch imaged at step 850, along with the selected system performance metrics of the virtual batter to actual pitched ball data stored in the memory of or communicatively coupled to the computerized device 106.

For instance, the memory of or communicatively coupled to the computerized device can include one or more databases that track and maintain statistics of real-life baseball games including defensive and offensive performances. For example, a database can track and store entries of real-life pitches made together with their respective real-life outcomes. Along with that information, other data such as information about the hitters, fielders and environmental factors is stored in association with each real-life pitch and its real-life outcome. For example, the computerized device 106 is communicatively coupled to a database of MLB pitching and hitting information (though it should be understood that similar databases of other leagues or simulators can be used). Among other information, the database can store batter data such as the batter's name, age, weight, power, hitting side, running speed, and more. The database also stores entries for every pitch thrown in an MLB game. For each pitched ball, the database can store corresponding pitch metrics (e.g., speed, location, spin, movement (e.g., break or fade and/or rise or fall), etc.) of the real-life pitched ball, the pitcher and batter involved in the pitch, and the real-life outcome of the pitch (e.g., swing and miss, ground-out to shortstop, home run to right field). Other information such as distance, speed, and time of the real-life outcome can be stored. It is therefore possible based on this information to determine, for example, when a fly ball to right field was hit, how long it took the ball to reach its destination at right field, the speed at which the ball traveled, the trajectory (e.g., height, arc, etc.), the distance to the destination at right field, and the like. Any number of metrics can be measured for a real-life pitch, and any number of metrics can be referenced in a database in determining a real-life outcome in view of a real-life pitch. How these metrics are measured is within the knowledge of a person skilled in the art in view of the present disclosure. For example, a person skilled in the art will know existing databases in which various pitch and hit metrics are provided, including but not limited to the Statcast databases, which has ties with Major League Baseball of New York, N.Y. (see http://m.mlb.com/glossary/statcast, and http://m.mlb.com/news/article/119234412/statcast-primer-baseball-will-never-be-the-same/), the databases associated with Baseball Savant (e.g., MLB PITCHf/x), which also appears to have ties with Major League Baseball and Daren Willman (see http://baseballsavant.mlb.com), and HitTrax databases, owned by InMotion Systems, LLC of Northborough, Mass.

Thus, in some instances, to determine the virtual pitched ball outcome of the real-life pitch captured at step 850, the computerized device 106 identifies, within the database(s), matching pitches—namely stored entries of pitches having metrics similar to the real-life pitch imaged at step 850. The identified matching pitches are further narrowed based on the selected system performance metrics of the virtual batter, such that if the selected system performance metrics indicate that David Ortiz is the virtual batter to whom the real-life pitch is delivered, the computerized device 106 can narrow the matching pitches accordingly. Similarly, the identified matching pitches can be based on a broader pool of candidates for matching real-life pitches, such as all 13-year-olds playing at a particular level of Little League. In other words, the results references in making a determination of the result in response to the real-life pitch can be passed on a skill level of the virtual hitter (and likewise the skill level of the virtual fielders to the extent that information is further relied upon to make determinations of real-life outcomes in response to the pitched ball). Based on the identified matching pitches, the system provides the predicted virtual pitched ball outcome of the real-life pitch. For example, if the computerized device identifies in the database three pitches that match the real-life pitch imaged at step 850 and the specified system performance metrics, and those three pitches are all ground-outs to first base, then, the computerized device will determine and output the virtual pitched ball outcome of the real-life pitch as a groundout to first base. Because the system can rely on data based on skill level, a specific pitch for one skill level can result in a different outcome than for another skill level (e.g., a specific pitch may yield a ground out to a shortstop at a high school level but a single at a collegiate level; similarly, a specific pitch may yield a deep fly ball double to right field at a professional level but a medium depth fly ball out to the right fielder at a high level because the pitch overmatched the less-skilled hitter).

It should be understood that the virtual pitched ball outcome can be determined based on any number of system performance metrics. For instance, by way of further example, a pitcher may wish to train more generally against left handed hitters, rather than a specific left handed hitter such as David Ortiz. In such a case, the virtual pitched ball outcome can be determined using fewer system performance metrics than in the example above in which a specific player is selected. The virtual pitched ball outcome can be nonetheless similarly determined by searching, within the database or databases, for entries of matching pitches to all left handed hitters in the database. If a pitch is measured as having pitch metrics of, for example: maximum velocity of 89 miles per hour (mph), spin rate of 2,300 revolutions per minute, vertical drop of 7 inches and left-to-right fade of 3 inches, and crossing the plate at the bottom center of the strike zone, the computerized device 106 searches the database or databases to find entries of pitches having one or more matching or substantially similar characteristics.

Substantially similar pitches can be included in a set of matching pitches, for example, (1) if the number of matching pitches found is below a certain threshold such that the data sample is determined to be too small, and/or (2) if the metrics of the substantially similar pitches are within a certain amount of deviation from the metrics of the real-life pitch. The amount of percentage of deviation allowed for a substantially similar pitch to be considered a matching pitch can be based on a threshold that can be preset or predetermined, or a threshold that is determined based on the number of identified matching pitches. For example, substantially matching pitches can be considered to be matching pitches if they are within 2% (or, for example, 0.5%, 1%, 3%, 5%, 10%, etc.) of the pitch metrics of the real-life pitch. This percentage can change on a per-metric basis, or can be provided not on percentage, but on a +/− scale, such that the metric is within +/−1 (or, for example 0.5, 2, 3, 5, 10, etc.) of a given data point. For example, in some exemplary embodiments, a pitch in a database can be considered to be a matching pitch to the real-life pitch if the pitch in the database has a maximum velocity within +/−1 mph of the real-life pitch, a spin within +/−2% of the real-life pitch, a location within +/−2 inches of the real-life pitch, and a movement (e.g., break or fade and/or rising or falling) within +/−2 inches of the real-life pitch. A person skilled in the art will recognize that these parameters for identifying a matching pitch can be adjusted without departing from the spirit of the present disclosure. Alternatively, if only five matching pitches are identified in the database, the simulator can adjust the threshold to allow for the most similar 10 (or, for example, 20, 50, 100, 500, 1000, etc.) pitch entries to be considered matching pitches. The thresholds can be adjusted one or more pitch metrics at a time. For example, the threshold can be expanded for a single metric such as speed until the target number of matching pitches is identified, or all of the pitch metrics can be adjusted at once until the target number of matching pitches is identified. Based on the metrics and the matching pitches of one example discussed above, the computerized device 106 determines, for example, that 72% of such pitches, when made to left handed hitters, produced a hit with an average exit velocity of 84 mph, and resulted in a ground ball out to the right side of the field. While the examples provided above primarily discuss pitch speed, any metric related to the real-life pitch can be used, and any such metric (e.g., location of pitch, spin of pitch, movement of the pitch (e.g., whether the pitch is breaking or fading and/or whether the pitch is rising or falling), etc.), including multiple metrics at a time, can have matching pitches that are considered substantially matching pitches. The term matching pitch can include substantially matching pitches, where the system is set-up to define what constitutes a substantially matching pitch in accordance with the present disclosures and knowledge of those skilled in the art.

In some embodiments, the computerized device 106 can randomize the virtual pitched ball outcome based on the identified likelihood of all potential outcomes. The potential outcomes (also referred to as "candidate outcomes") are the outcomes of the pitch entries identified as being matching pitches. Thus, if in the matching pitches identified from the database, 72% of the pitches matching the real-life pitch result in hits (e.g., ground ball, fly ball) that lead to an out on the right side of the field, and the other 28% of the time those pitches matching the real-life pitch result in a swing-and-miss, the computerized device 106 identifies two candidate outcomes: (1) out to right side of the field, and (2) swing-and-miss. The pitched ball outcome, which is the virtual outcome of the pitch captured at step 850, is calculated by randomizing the odds or probabilities of the occurrence of each of the two candidate outcomes (e.g., 72% and 28%). The odds can be adjusted or continued to be tracked and applied over a pitcher's session such as an at-bat or a set of at-bats amounting to a simulated game.

In some embodiments, the virtual pitched ball outcome determined at step 854 can be further refined, at step 856, based on additional system performance metrics, such as system performance metrics associated with a virtual fielder and/or environmental factors.

A virtual fielder is a digital representation of a real person or a hypothetical construct of a person generated using demographic information and/or baseball related fielding attributes. The hypothetical construct of the person can be a generalization of a type of person or persons. System performance metrics of a virtual fielder include any data related to a real or hypothetical fielder's personal characteristics and/or fielding-related characteristics. Non-limiting examples of system performance metrics of a virtual fielder include running speed, and arm strength.

Environmental factors are digital representations of environmental conditions and/or attributes of a real or hypothetical venue. A real venue refers to a real-world stadium, field, dome or the like used for baseball, softball or similar sporting events. The real world venue can be a stadium used for Major League Baseball events, such as Fenway Park in Boston, Mass. or Dodger Stadium in Los Angeles, Calif. A hypothetical venue is construct of a venue based on a set of individually selected characteristics or characteristics derived from real-world venues. Characteristics can include location, temperature, elevation, field dimensions, size of outfield walls, type of venue (e.g., dome, open air), turf (e.g., grass, different species of grass more particularly, turf, different iterations of turf), etc. The hypothetical venue can be a generalization of a type or types of venues, such as baseball stadiums in Colorado, Division I women's softball stadiums, etc. Non-limiting examples of environmental factors include temperature, precipitation, wind direction, wind speed, turf type, elevation, etc.

As described above, at step 854, a virtual pitched ball outcome is determined by identifying matching pitches in a database based on pitch metrics and virtual batter system performance metrics. The matching pitches include information about the outcome of each matching pitch and other attributes (e.g., speed, distance) associated with each outcome. Additionally, environmental condition information can be stored in association with each of the matching pitches. In some embodiments, the virtual pitched ball outcome can be refined at step 856 by further narrowing the previously identified matching pitches, and/or modifying the identified virtual pitched ball outcome based on the system performance metrics associated with virtual fielders and environmental factors.

For example, in one scenario, the simulator system can identify one hundred matching pitches at step 854 that match the calculated pitch metrics and virtual batter system performance metrics. At step 856, the input or retrieved system performance metrics related to virtual fielders and/or environmental factors can be used to identify stronger matching pitches within the initial set of one hundred matching pitches identified at step 854. For instance, system performance metrics related to virtual fielders can be selected to be the 2012 New York Yankees opening day team. System performance metrics related to environmental factors can be selected to be Yankee Stadium in New York, N.Y. Thus, at step 856, the simulation system identifies within the one hundred matching pitches whether they were made against the 2012 New York Yankees opening day team and/or at Yankee Stadium. If is determined that only a single pitch, among the set of one hundred matching pitches, was indeed made at opening day 2012 at Yankee Stadium, the virtual pitched ball outcome is set to match the outcome of that single identified matching pitch. If, in another scenario, the set of one hundred matching pitches is narrowed to a set of ten matching pitches, the virtual pitched ball outcome can be determined as described above in connection with step 854 (e.g., by proportionally randomizing the results of those ten matching pitches).

In another example, the virtual pitched ball outcome identified at step 854 can be further narrowed by applying additional performance metrics. For instance, the simulator system 854 in one scenario can identify, at step 854, the virtual pitched ball outcome based on a single identified matching pitch. If the virtual pitched ball outcome is a fly ball out to center-right field at a distance of approximately 315 feet from the plate 107, the system can adjusted that virtual pitched ball outcome based on the selected virtual fielder and/or environmental factors system performance metrics. With respect to applying the environmental factors system performance metrics, for example, the trajectory, distance or other information related to the matching pitch used to generate the virtual pitched ball outcome can be adjusted. For instance, if the matching pitch includes information indicating that the hit ball traveled 315 feet when the wind was blowing at 10 miles per hour in a direction from the outfield towards the plate 107, the distance of 315 can be adjusted if the environmental factors system performance settings indicate that wind conditions are calm (i.e., no wind). In such a case, the distance would be adjusted such that the ball would travel further than 315 feet (e.g., 325 feet.)

The virtual fielder system performance metrics can also be applied to refine the virtual pitched ball outcome. For instance, the running speed of the virtual right fielder indicated in the virtual fielder performance metrics can be used to calculate the time it would take the virtual right fielder to reach the end location of the ball—e.g., 325 feet, as newly calculated based on the environmental factor system performance metrics. If it is determined that the virtual right fielder's speed would not allow the virtual fielder to reach the ball in time to cause an out, the virtual pitched ball outcome could be adjusted accordingly. In such as case, the virtual pitched ball outcome determined at step 854 to be a fly ball out to right center-field would be adjusted to be a hit to center-right field.

A person skilled in the art will recognize a variety of other ways the system performance metrics can be applied to the pitched ball to make a virtual pitched ball outcome determination in view of the present disclosures. The present disclosure is by no means limited to making determinations based on "similar pitches," although that is one exemplary way of operating the system. Different ways the system performance metrics can be applied to a pitched ball will depend on a variety of factors, including but not limited to the data available for system performance metrics and the preferred way to use that data by those operating the system. The present system and methods can also be used to match trends in performance metrics as a way of identifying indicators for injuries of actual pitchers. For example, in view of the present disclosures, a person skilled in the art can review the metrics of a pitcher over months leading up to an arm injury and can use the systems and methods provided for in the present disclosure to track similar trends in real-life pitchers to determine if the real-life pitcher is showing signs of similar development, and thus is more susceptible to a similar injury. Essentially the present systems and methods can be used as an early warning sign of potential pitching injury, allowing somebody to set-in and possibly prevent the injury from happening by making adjustments to the real-life pitchers' pitch count, motion, form, routine, technique, days pitches, etc.

At step 858, the computerized device 106 outputs the identified virtual pitched ball outcome and related information. For instance, the virtual pitched ball outcome can include an indication of the calculated virtual pitched ball outcome for the real-life pitch, such as a graphical and/or textual notification of whether the outcome is, for example, a home run. The output can also include information related to the virtual pitched ball outcome, such as how far the home run was hit, its direction on the baseball field, the velocity of the ball immediately after impact, the time for the ball to reach its landing point, and the arc or trajectory of the hit ball. In some embodiments, metrics of the pitch and/or the system performance metrics used to identify the virtual pitched ball outcome are also output with the virtual pitched ball outcome.

Real-life pitching can be incorporated into a gaming module, including the gaming modules described herein. In such a gaming module, one or two real-life pitchers deliver pitches in a cage simulator or similar environment. The virtual pitched ball outcome of each real-life pitch is determined as described above based on system performance metrics of virtual batters, defenses, and/or environmental factors, as input by users or automatically determined by the computerized device 106. Each virtual pitched ball outcome corresponding to each real-life pitch is aggregated into at-bats, innings and/or games.

It should be understood that, in some embodiments, the output virtual pitched ball outcome and information used to generate the virtual pitched ball outcome can be stored in one or more memories. This information can be retrieved, used and/or output by a pitching coaching or training platform, in line with the batting coaching described above.

What is claimed is:

1. A pitching simulator system comprising:
    a detector device operable to image a real-life pitch of a ball, and
    a computerized device communicatively coupled to the detector device, the computerized device being operable to:
        retrieve one or more system performance metrics from a compilation of data, the one or more system performance metrics relating to at least a virtual batter;
        identify one or more pitch metrics corresponding to the real-life pitch;
        calculate a virtual pitched ball outcome based on a combination of the one or more pitch metrics and the one or more system performance metrics; and
        output the virtual pitched ball outcome via an output device,
    wherein the one or more system performance metrics are retrieved prior to the real-life pitch of the ball,
    wherein the one or more pitch metrics include one or more of location, speed, and spin of the ball during the real-life pitch, and
    wherein the virtual pitched ball outcome is a predicted real-life outcome for the ball of the real-life pitch.

2. The system of claim 1,
    wherein the real-life pitch comprises a sequence measured from at least a first instance to at least a second instance, and
    wherein the first instance is a time when the ball is released by a pitcher, and the second instance is a time when the ball crosses a plate.

3. The system of claim 1,
    wherein the real-life pitch comprises a sequence measured from at least a first instance to at least a second instance, and
    wherein the first instance is a time when a pitcher initiates a wind-up motion for the real-life pitch, and the second instance is a time when the ball crosses a plate.

4. The system of claim 1, wherein the computerized device being operable to calculate a virtual pitched ball outcome further comprises the computerized device being operable to:
    identify matching pitches from one or more databases;
    determine one or more candidate outcomes based on the matching pitches;
    calculate odds for each of the candidate outcomes;
    select one of the candidate outcomes based on the respective odds; and
    assign the selected one of the candidate outcomes to the virtual pitched ball outcome.

5. The system of claim 4,
    wherein the matching pitches comprise stored entries of real-life pitches, and
    wherein each of the entries comprises, for each of the respective matching pitches, one or more of: (1) pitch metrics, (2) pitch outcome, (3) batter data, (4) fielder data, and (5) environmental factors.

6. The system of claim 5, wherein the one or more databases comprise one or more databases of real-life offensive and defensive data tracked from a baseball league.

7. The system of claim 1, wherein the system performance metrics of a virtual batter comprise metrics related to an ability of the virtual batter to hit the real-life pitch based on the one or more pitch metrics corresponding to the real-life pitch.

8. The system of claim 7,
    wherein the one or more system performance metrics further relate to one or more virtual fielders and one or more environmental factors,
    wherein the system performance metrics of the one or more virtual fielders comprise metrics related to an ability of a fielder to at least one of field the ball and throw the fielded ball, and
    wherein the system performance metrics of the one or more environmental factors comprise attributes associated with at least one of a virtual playing field and virtual playing conditions.

9. The system of claim 8, wherein the one or more system performance metrics are calculated for the virtual batter, the one or more virtual fielders, the virtual playing field, and the virtual playing conditions based on real-life metrics of a real-life batter, a real-life fielder, a real-life playing field, and real-life playing conditions, respectively.

10. The system of claim 7, wherein the system performance metrics of the virtual batter include system performance metrics of the virtual batter as a virtual base runner.

11. The system of claim 1, wherein the detector device is configured to capture images of the ball during the real-life pitch at a frames per second rate exceeding a determined threshold.

12. The system of claim 1, wherein the computerized device being operable to identify the one or more pitch metrics corresponding to the real-life pitch further comprises the computerized device being operable to identify the one or more pitch metrics based on images of the real-life pitch taken by the detector device.

13. The system of claim 1, wherein the computerized device being operable to identify the one or more pitch metrics corresponding to the real-life pitch further comprises the computerized device being operable to calculate attributes of the ball.

14. The system of claim 1, wherein the detector device comprises one or more cameras.

15. A method for determining outcomes from pitched balls, comprising:
imaging a real-life pitch of a ball;
retrieving one or more system performance metrics from a compilation of data, the one or more system performance metrics relating to at least a virtual batter;
identifying one or more pitch metrics corresponding to the real-life pitch;
calculating a virtual pitched ball outcome based on a combination of the identified one or more pitch metrics and the one or more retrieved system performance metrics; and
outputting the virtual pitched ball outcome,
wherein the one or more system performance metrics are retrieved prior to the real-life pitch of the ball,
wherein the one or more pitch metrics include one or more of location, speed, and spin of the ball during the real-life pitch, and
wherein the virtual pitched ball outcome is a predicted real-life outcome for the ball of the real-life pitch.

16. The method of claim 15,
wherein the real-life pitch comprises a sequence measured from at least a first instance to at least a second instance, and
wherein the first instance is a time when the ball is released by a pitcher, and the second instance is a time when the ball crosses a plate.

17. The method of claim 15,
wherein the real-life pitch comprises a sequence measured from at least a first instance to at least a second instance, and
wherein the first instance is a time when a pitcher initiates a wind-up motion for the real-life pitch, and the second instance is a time when the ball crosses a plate.

18. The method of claim 15, wherein calculating the virtual pitched ball outcome includes:
identifying matching pitches from one or more databases;
determining one or more candidate outcomes based on the matching pitches;
calculating odds for each of the candidate outcomes;
selecting one of the candidate outcomes based on the respective odds; and
assigning the selected one of the candidate outcomes to the virtual pitched ball outcome.

19. The method of claim 18,
wherein the matching pitches comprise stored entries of real-life pitches, and
wherein each of the entries comprises, for each of the respective matching pitches, one or more of: (1) pitch metrics, (2) pitch outcome, (3) batter data, (4) fielder data, and (5) environmental factors.

20. The method of claim 19, wherein the one or more databases comprise one or more databases of real-life offensive and defensive data tracked from a baseball league.

21. The method of claim 15, wherein the system performance metrics of a virtual batter comprise metrics related to an ability of the virtual batter to hit the real-life pitch based on the one or more pitch metrics corresponding to the real-life pitch.

22. The method of claim 21,
wherein the one or more system performance metrics further relate to one or more virtual fielders and one or more environmental factors,
wherein the system performance metrics of the one or more virtual fielders comprise metrics related to an ability of a fielder to at least one of field the ball and throw the fielded ball, and
wherein the system performance metrics of the one or more environmental factors comprise attributes associated with at least one of a virtual playing field and virtual playing conditions.

23. The method of claim 22, wherein the one or more system performance metrics are calculated for the virtual batter, the one or more virtual fielders, the virtual playing field, and the virtual playing conditions based on real-life metrics of a real-life batter, a real-life fielder, a real-life playing field, and real-life playing conditions, respectively.

24. The method of claim 21, wherein the system performance metrics of the virtual batter include system performance metrics of the virtual batter as a virtual base runner.

25. The method of claim 15, wherein imaging a real-life pitch of a ball further comprises capturing images of the ball during the real-life pitch at a frames per second rate that exceeds a determined threshold.

26. The method of claim 15, wherein identifying the one or more pitch metrics corresponding to the real-life pitch further comprises identifying the one or more pitch metrics based on the imaging of the real-life pitch.

27. The method of claim 15, wherein identifying the one or more pitch metrics corresponding to the real-life pitch further comprises calculating attributes of the ball.

* * * * *